(12) United States Patent
Miyahisa et al.

(10) Patent No.: US 7,629,076 B2
(45) Date of Patent: Dec. 8, 2009

(54) BATTERY AND METHOD FOR MANUFACTURING THE SAME

(75) Inventors: Masaharu Miyahisa, Fujisawa (JP);
Hideki Kasahara, Kanagawa (JP);
Yoshiyuki Tada, Fujisawa (JP);
Toshitaka Niitsuma, Chigasaki (JP)

(73) Assignee: Panasonic Corporation, Osaka (JP)

( * ) Notice: Subject to any disclaimer, the term of this patent is extended or adjusted under 35 U.S.C. 154(b) by 133 days.

(21) Appl. No.: 10/923,949

(22) Filed: Aug. 24, 2004

(65) Prior Publication Data

US 2005/0147878 A1    Jul. 7, 2005

(30) Foreign Application Priority Data

| Aug. 28, 2003 | (JP) | ............................. 2003-304051 |
| Oct. 23, 2003 | (JP) | ............................. 2003-362872 |
| Feb. 24, 2004 | (JP) | ............................. 2004-047469 |

(51) Int. Cl.
*H01M 6/00* (2006.01)
*H01M 6/08* (2006.01)
*H01M 2/00* (2006.01)
*H01M 2/08* (2006.01)

(52) U.S. Cl. ........................ 429/122; 429/164; 429/163; 429/185; 429/186

(58) Field of Classification Search ................. 429/164, 429/122, 163, 185, 186
See application file for complete search history.

(56) References Cited

U.S. PATENT DOCUMENTS

| 5,958,620 A | * | 9/1999 | Nagaura ..................... 429/164 |
| 6,524,739 B1 | | 2/2003 | Iwaizono et al. |

2001/0036571 A1 * 11/2001 Oogami et al. ................. 429/94

FOREIGN PATENT DOCUMENTS

| JP | 58-74768 | 5/1983 |
| JP | 6-267516 | 9/1994 |
| JP | 2001-155712 | 6/2001 |
| JP | 2001-256935 | 9/2001 |

OTHER PUBLICATIONS

English Language Abstract of JP 2001-155712.
English Language Abstract of JP 2001-256935.
English Language Abstract of JP 6-267516.
Partial English Language Translation of JP 5-74768.

* cited by examiner

*Primary Examiner*—Patrick Ryan
*Assistant Examiner*—Helen O Chu
(74) *Attorney, Agent, or Firm*—Greenblum & Bernstein P.L.C.

(57) ABSTRACT

A battery having a collecting structure that can reduce internal resistance of the battery and a structure that allows easy manufacturing of the battery by the following processes is provided. An enlarged portion is formed near an opening end of a battery case and a supporting ledge is provided on the inner surface of the lower end of the enlarged portion. A collector of one polarity is bonded to an electrode plate group. A connection lead is bonded to the collector at one end and is bonded to a lower surface of a sealing member at the other end. An insulation gasket is mounted to a peripheral edge portion of the sealing member from a side opposite to the collector. The peripheral edge portion of the sealing member is supported by the supporting ledge with the insulation gasket interposed therebetween. Then, the peripheral edge portion of the sealing member is horizontally fastened and securely held via the insulation gasket by caulking the opening end of the battery case and performing a process for reducing the diameter of the enlarged portion.

5 Claims, 20 Drawing Sheets

Fig. 9A
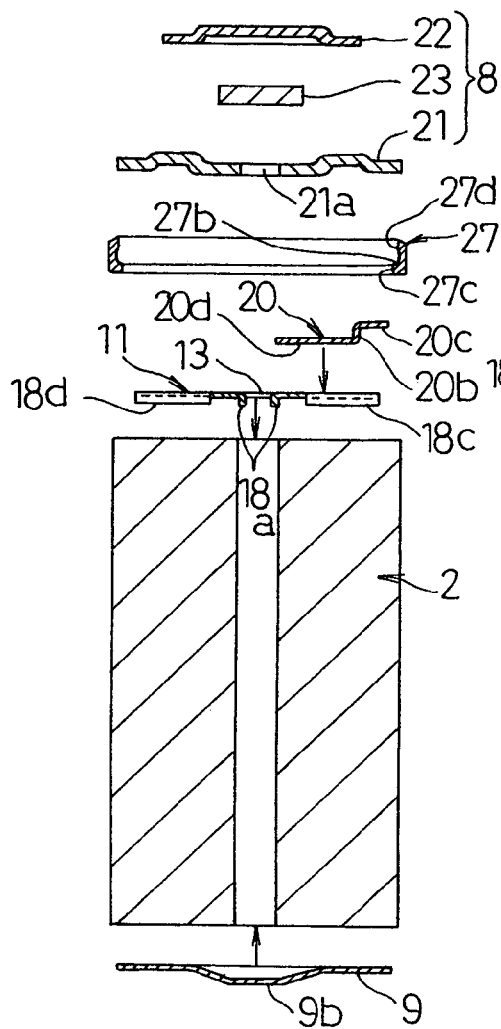
Fig. 9B
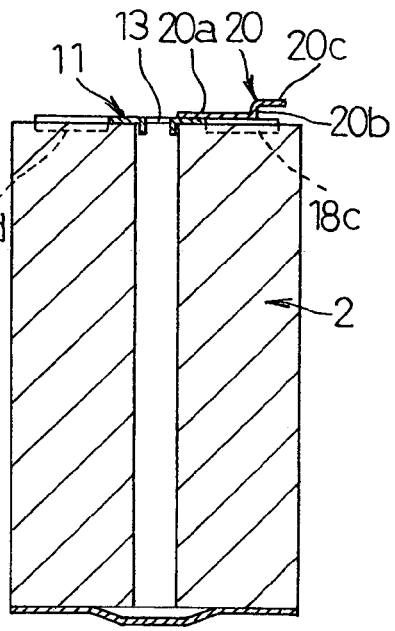
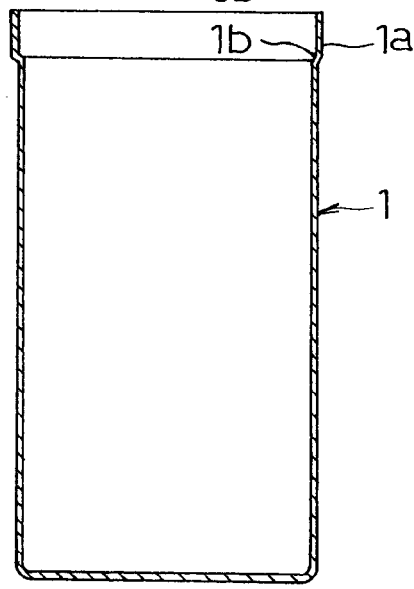

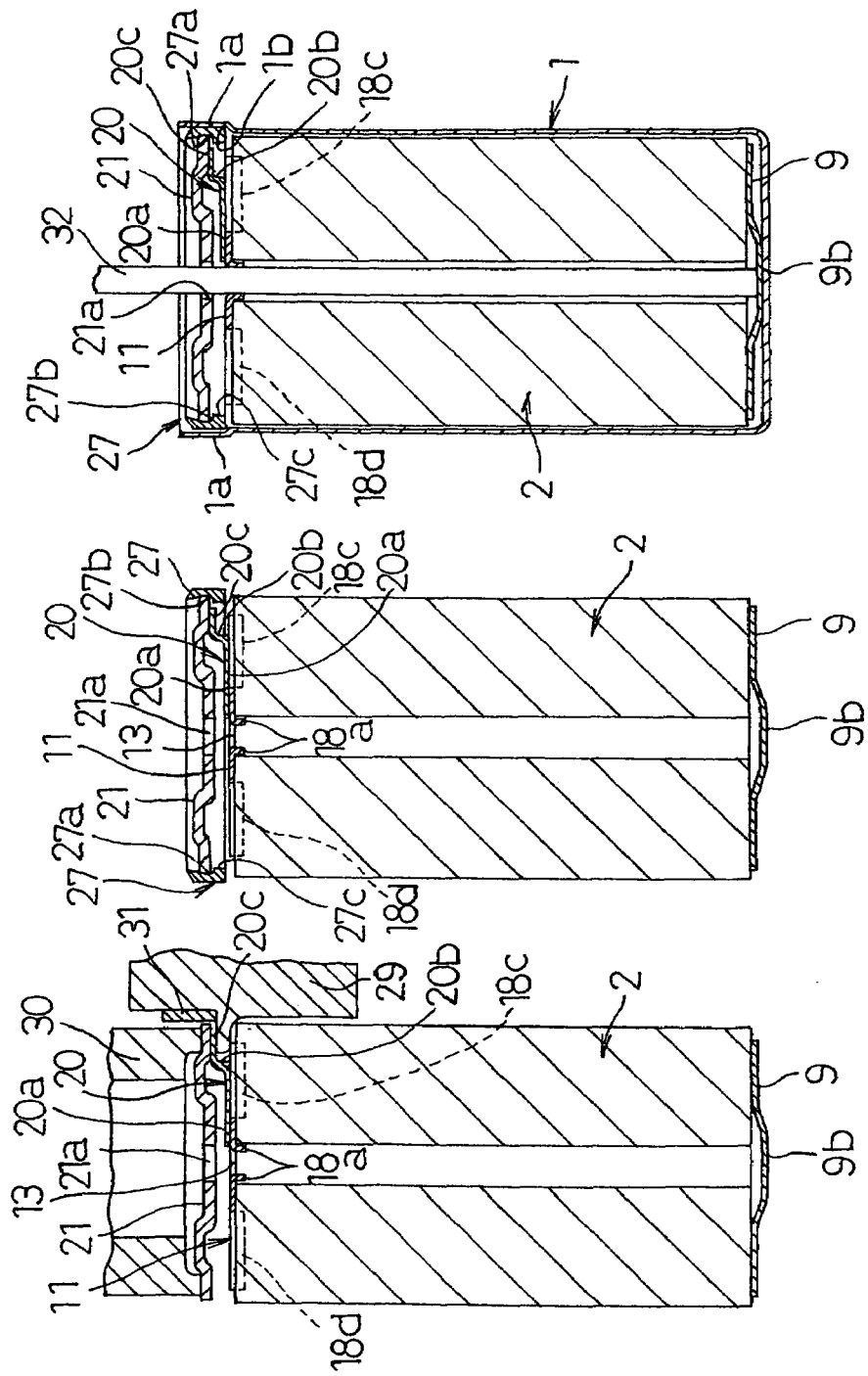

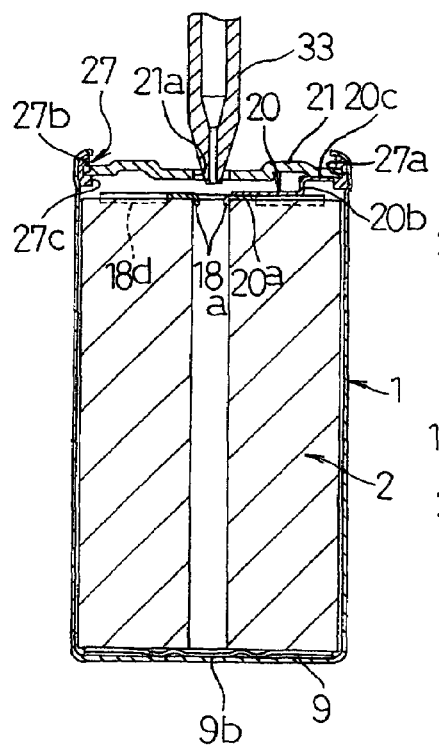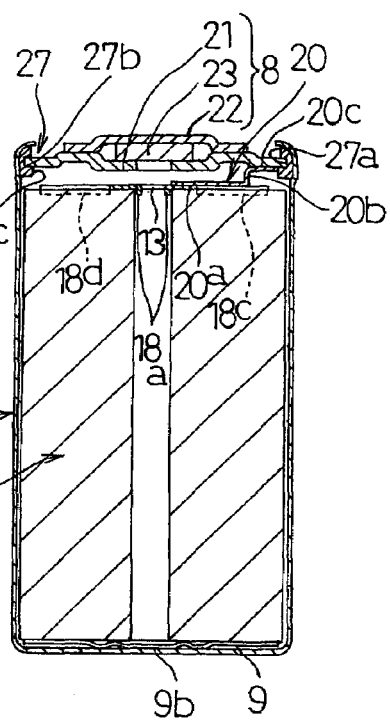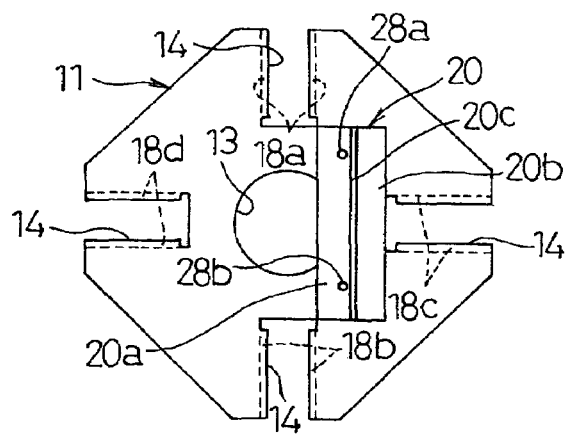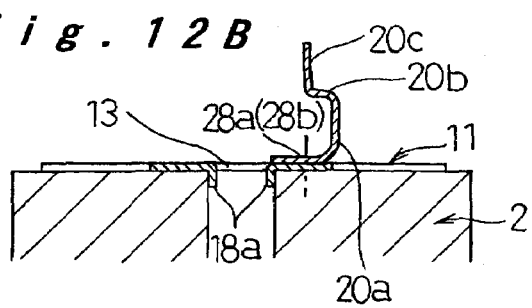

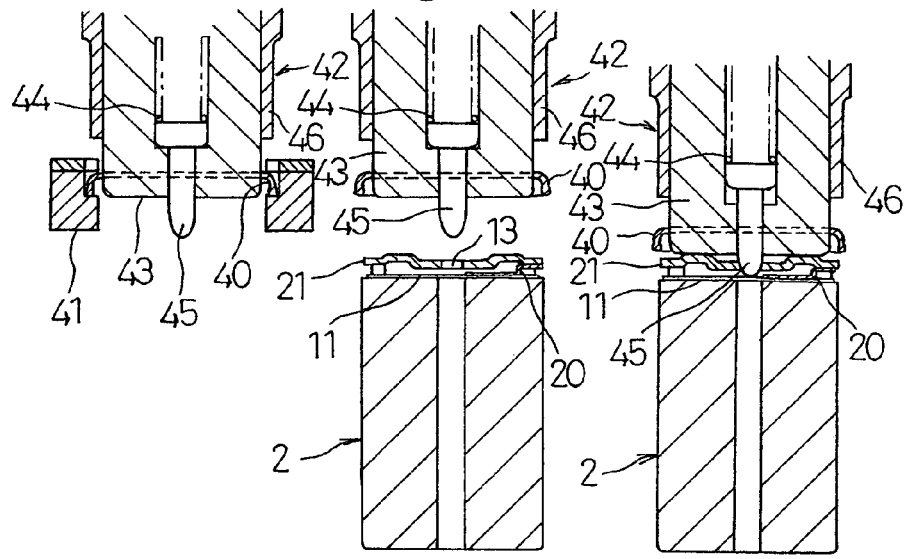
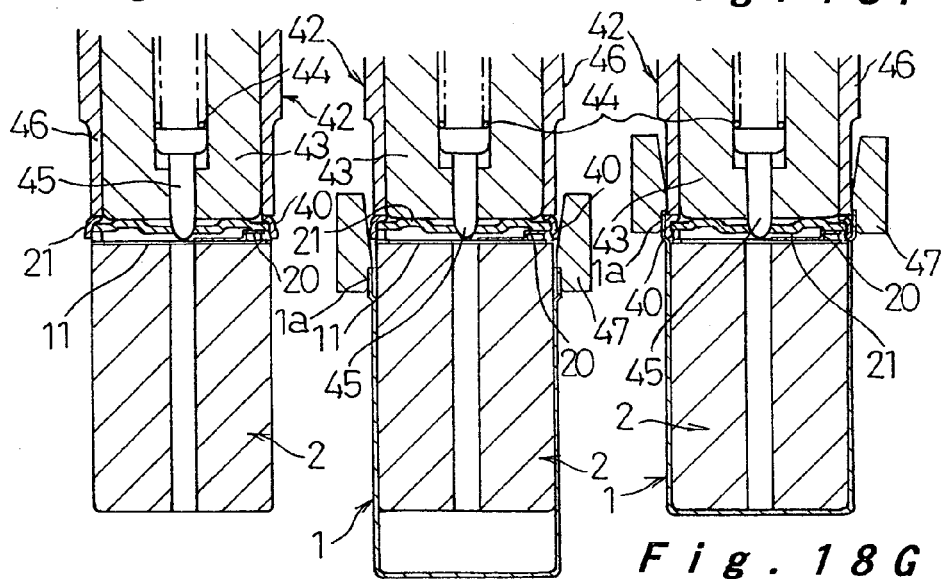
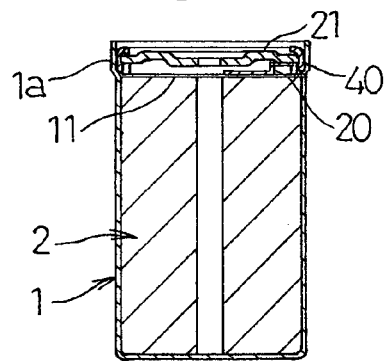

BATTERY AND METHOD FOR MANUFACTURING THE SAME

The present disclosure relates to subject matter contained in priority Japanese Patent Application Nos. 2003-304051, 2003-362872 and 2004-047469, filed on Aug. 28, 2003, Oct. 23, 2003 and Feb. 24, 2004, respectively, the contents of which is herein expressly incorporated by reference in its entirety.

BACKGROUND OF THE INVENTION

1. Field of the Invention

The present invention relates to a battery having a collecting structure and a sealing structure that are novel and allow increase of output and capacity, and a method for manufacturing such battery in a suitable manner.

2. Description of the Related Art

In recent years, it has been advanced rapidly to make electronic devices such as audio-video equipment and a personal computer or mobile communication equipment portable and/or cordless. As a driving power source of these electronic devices, an aqueous battery such as a nickel-cadmium battery or nickel metal hydride battery was typically used conventionally. However, the aqueous battery has been recently replaced with a non-aqueous electrolyte battery that can be charged quickly and is high in both volume energy density and weight energy density. As a typical non-aqueous electrolyte battery, a lithium rechargeable battery is known. On the other hand, the nickel-cadmium battery and the nickel metal hydride battery mentioned above have been specialized in applications requiring large load characteristics, such as a driving power source of a cordless power tool or an electric vehicle. Thus, the nickel-cadmium battery and the nickel metal hydride battery are required to have larger current discharging characteristics.

As a conventional battery that can be used in large-current discharging application, a battery having a structure shown in FIG. 19 is known. This battery (hereinafter, referred to as a first conventional battery) includes an electrode plate group 50 accommodated in a metal battery case 51 that is a cylinder having a bottom. The electrode plate group 50 includes a strip-shaped positive electrode plate and a strip-shaped negative electrode plate (both not shown) that are overlapped with a separator (not shown) interposed therebetween and are wound spirally. A structure for collecting an output from and an input to the positive and negative electrode plates is formed as follows, here the structure being suitable for large-current discharge. The electrode plate group 50 is arranged in such a manner that an end (not shown) of the positive electrode plate protrudes above the electrode plate group 50 and an end (not shown) of the negative electrode plate protrudes below the electrode plate group 50. To the end of the positive electrode plate, a substantially circular disk-like positive collector 52 is welded at a plurality of positions. To that positive collector 52, one end 53a of a positive lead 53 is welded by resistance welding. The other end 53b of the positive lead 53 is welded to a filter portion 57 of a sealing member 54 by resistance welding. Furthermore, a negative collector (not shown) is welded to the end of the negative electrode plate by resistance welding, and a negative collecting piece (not shown) of the negative collector, which is like a tongue shape, is welded to the bottom of the battery case 51 by resistance welding.

The sealing member 54 includes the filter portion 57, a cap-shaped positive terminal 58 and a safety vent body 59 interposed between the filter portion 57 and the positive terminal 58, all of which are integrated to form one unit. In the sealing member 54, the safety vent body 59, while being compressed, closes a vent opening 57a of the filter portion 57. When a pressure inside the battery has reached or exceeded a set pressure that is set by the safety vent body 59, the safety vent body 59 changes its shape so as to open the vent opening 57a, thereby allowing gas to escape to the outside through the vent opening 57a to decrease its internal pressure. Then, the shape of the safety vent body 59 returns to its original shape, thereby closing the vent opening 57a.

In an outer circumferential surface of the battery case 51, an annular groove 51a is provided. The annular groove 51a forms an annular supporting portion 51b in such a manner that the supporting portion 51b bulges inward. The sealing member 54 is supported by the supporting portion 51b with an insulation gasket 60 interposed therebetween. In addition, the peripheral edge portion of the filter portion 57 is held and secured by upper and lower opening edge portions of the battery case 51, that have been caulked inward, from above and beneath, with the insulation gasket 60 interposed therebetween, so that the sealing member 54 is secured. Moreover, a ring-like upper insulation plate 61 is provided between the upper end of the peripheral edge portion of the electrode plate group 50 and the lower surface of the annular supporting portion 51b. This ring-like upper insulation plate 61 secures the electrode plate group 50 within the battery case 51 so as not to allow any movement of the electrode plate group 50 and also prevents short-circuit between the electrode plate group 50 and the annular supporting portion 51b that may occur when they come into contact with each other.

In the above battery, the positive lead 53 is bent at two positions to have a substantially Z-shape when seen from the side thereof, in order to prevent short-circuit between the positive lead 53 and the annular supporting portion 51b of the battery case 51 that may occur when the positive lead 53 comes into contact with the annular supporting portion 51b. Aside from this, a battery shown in FIG. 20 (hereinafter, referred to as a second conventional battery) includes the positive lead 53 that is bent at one position. In FIG. 20, the components that are the same as or similar to those in FIG. 19 are labeled with the same reference numerals, and the redundant description is omitted.

The second conventional battery is fabricated in the following assembly processes. As shown in FIGS. 21A and 21B, the electrode plate group 50 is inserted into the battery case 51 and thereafter the positive collector 52 and the negative collector (not shown) are welded to the positive and negative electrode plates, respectively. Then, the ring-like upper insulation plate 61 is inserted into the battery case 51 and is placed on the positive collector 52. Subsequently, the annular groove 51a is formed at a predetermined portion on the outer circumferential surface of the battery case 51. Then, a predetermined portion 53a at one end of the positive lead 53 is welded to a portion of the positive collector 52 that is located on one side (on right side in FIG. 21A) of a central gap of the electrode plate group 50. Then, the positive lead 53 is bent at a portion near the welded portion perpendicularly and upward, so that the positive lead 53 stands to have a substantially L-shape and protrudes from the opening of the battery case 51. Thereafter, the filter portion 57 of the sealing member 54 that has been assembled in advance is welded to a predetermined portion 53b at the other end of the positive lead 53. The reason why the positive lead 53 is bent to stand up above the central portion of the electrode plate group 50 is to achieve smooth insertion of the sealing member 54 into the opening of the battery case 51 having the annular supporting portion 51b without bringing the lower end of the filter portion 57 of the sealing member 54 into contact with the annular supporting portion 51b.

Subsequently, the positive lead 53 is bent to be curved so as to rotate the sealing member 54 as shown with an arrow in FIG. 21A, thereby arranging the sealing member 54 in a relative arrangement that enables insertion of the sealing member 54 into the opening of the battery case 51. Then, the sealing member 54 is inserted into the battery case 51 and the peripheral edge of the filter portion 57 of the sealing member 54 is placed on the annular supporting portion 51b of the battery case 51 with the insulation gasket 60 interposed therebetween. At this time, the other end 53b of the positive lead 53 is arranged above the gap of the center of the electrode plate group 50. In this state, an opening edge portion of the battery case 51 is caulked inward. Thus, the opening edge portion compresses the insulation gasket 60, so that the peripheral edge portion of the filter portion 57 is held securely.

In most conventional batteries, the opening of the battery case 51 is sealed with the sealing member 54, as shown in FIG. 19, and thereafter a pressure is applied to the battery case 51 in a direction along the axis of the battery case 51 (vertical direction of the battery case 51) so as to press the sealing member 54 down toward the inside of the battery case 51 while flattening out the annular groove 51a. As a result, the sealing member 54 securely presses the electrode plate 50 by means of the upper insulation plate 61 with the positive lead 53 interposed therebetween. During this application of the pressure, the positive lead 53 is deformed so as to be folded. However, the vent opening 57a of the sealing member 54 may be closed by a portion of the positive lead 53, which is located at the center of the electrode plate group 50, because of variation of the position of the positive lead 53 at which the positive lead 53 is welded to the filter portion 57.

In order to overcome the above drawback, other batteries have been conventionally proposed. One of those batteries has a positive lead portion formed integrally with a positive collector portion with a folded portion positioned in therebetween. In this battery (hereinafter referred to as a third conventional battery), the conventional positive collector and positive lead are formed integrally with each other. The positive lead portion has a horseshoe shape with a U-shaped notch that is to fit into a ring-like projection projecting from the vent opening of the sealing member. See Japanese Utility Model Laid-Open Publication No. Sho 58-74768, for example.

Moreover, still another conventional battery (hereinafter, referred to as a fourth conventional battery) is fabricated in a process shown in FIG. 22 (see Japanese Patent Laid-Open Publication No. 2001-155712, for example). More specifically, the positive lead 53 is welded to a substantially central portion of the positive collector 52 at its one end 53a. Then, the positive lead 53 is bent upward at a portion near the welded portion perpendicularly so as to stand like an L-shape and is positioned in such a manner that a gas escape hole 53d provided at its other end portion is in agreement with the vent opening 57a of the filter portion 57 of the sealing member 54. In this state, portions 53b and 53c near the gas escape hole 53d are welded to the filter portion 57. Subsequently, the sealing member 54 is inserted into the opening of the battery case 51 while the positive lead 53 is bent, and is then placed on the annular supporting portion 51b with the insulation gasket 60 therebetween. Finally, the opening of the battery case 51 is caulked toward the inside of the battery case 51. Please note that the components in FIG. 22 that are the same as or similar to those in FIGS. 21A and 21B are labeled with the same reference numerals in order to omit the redundant description.

Moreover, still another battery assembled in a process shown in FIG. 23 has been conventionally proposed, as described in Japanese Patent Laid-Open Publication No. 2001-256935, for example. In FIG. 23, the components that are the same as or similar to those in FIG. 21A are labeled with the same reference numerals. This battery (hereinafter, referred to as a fifth conventional battery) is fabricated as follows. In welding of the positive lead 53 and the sealing member 54, firstly, one end of the positive lead 53 is welded to the peripheral end portion of the positive collector 52. Then, the filter portion 57 of the sealing member 54 arranged vertically above that welded portion of the positive lead 53 is welded to the other end of the positive lead 53. The sealing member 54 is then inserted into the opening of the battery case 51 while being rotated as shown with an arrow in FIG. 23 so as to be arranged horizontally. In this battery, one end of the positive lead 53 is welded to the peripheral end portion of the positive collector 52. Thus, the positive lead 53 does not exist above the gap at the center of the electrode plate group 50 when the annular groove (not shown) is flattened out after the sealing member 54 closed the opening of the batter case 51. Therefore, the vent opening 57a of the filter portion 57 cannot be closed by the positive lead 53.

Attaching the sealing member 54 to the insulation gasket 60 is performed in accordance with a procedure shown in FIGS. 24A through 24C (see Japanese Patent Laid-Open Publication No. Hei 6-267516, for example). More specifically, the sealing member 54 is inserted into the insulation gasket 60 at an angle, as shown in FIG. 24A, and one end of the filter portion 57 of the sealing member 54 is then brought into contact with a bottom surface of the insulation gasket 60, as shown in FIG. 24B. Finally, the other end of the filter portion 57 placed on the upper end portion of the insulation gasket 60 is pressed down so as to cause slight deformation of the insulation gasket 60 to the outside and is further pressed down along the inner side face of the insulation gasket 60. In this manner, the insertion of the sealing member 54 into the insulation gasket 60 is performed.

However, in the first conventional battery, the positive lead 53 is bent to have a substantially Z-shape, as shown in FIG. 19. Thus, a collecting distance increases as the length of the positive lead 53 increases. In addition, it is necessary to make the positive lead 53 in the first conventional battery thinner because the positive lead 53 has to be bent twice. This increases the internal resistance of the battery and acts as a factor of disturbing large-current discharge characteristics. Moreover, the welded portions of the long thin positive lead 53 and the sealing member 54 may come off when the battery receives strong impact or vibration and the electrode plate 50 is moved. This decreases vibration resistance or impact resistance of the battery.

The second conventional battery has an advantage that the length of the positive lead 53 can be made slightly shorter, as compared with the first conventional battery. However, since there is the annular supporting portion 51b for pressing the electrode plate group 50 and supporting the sealing member 54, and the filter portion 57 of the sealing member 54 and the upper end of the electrode plate group 50 are arranged above and below the annular supporting portion 51b, respectively, the filter portion 57 and the upper end of the electrode plate group 50 are arranged away from each other by a relatively large distance. Thus, the positive lead 53 has to have the length corresponding to the above large distance. This prevents the reduction of the internal resistance of the battery and the improvement of the large-current discharging characteristics. Moreover, in the second conventional battery, the sealing member 54 has to be arranged at the central portion of the battery case 51, as shown in FIG. 21A, when being bonded to the positive lead 53 that is bent to be L-shaped and thus erected. Thus, when electrolyte is injected into the battery case 51 after the bonding of the sealing member 54 to the positive lead 53, it is necessary to bend the positive lead 53 to the right from the state shown in FIG. 21A so as to move the sealing member 54 away from the gas escape hole 52a of the positive collector 52, then move the positive lead 53 back to the state shown in FIG. 21A after the injection of the electrolyte, and finally rotate the sealing member 54 in the direction shown with the arrow in FIG. 21A. Therefore, the increase of number of unnecessary work decreases productivity.

The third conventional battery also has problems mentioned below. When the horseshoe-shaped notch of the positive lead portion is positioned at the ring-like projection of the sealing member, secure positioning cannot be achieved unless the innermost portion of the notch is brought into contact with the ring-like projection. During the positioning, even a small misalignment causes variations of positions at which spot welding is performed or defective welding. Moreover, since the positive lead has a horseshoe shape, welded portions of spot welding directly receive load when vibration is applied to the battery. Thus, the welded portions may come off easily.

In the fourth conventional battery, welding of the positive lead 53 and the sealing member 54 to each other is performed while the sealing member 54 is displaced from the center of the battery case 51 toward the side of bending of the positive lead 53. Thus, there is an advantage that electrolyte can be injected without moving the sealing member 54 after the welding of the positive lead 53 and the sealing member 54. However, since the fourth conventional battery also has the annular groove 51a in the battery case 51, the filter portion 57 of the sealing member 54 and the upper end of the electrode plate group 50, that are arranged above and below the annular supporting portion 51b, respectively, are away from each other by a relatively large distance. Thus, the positive lead 53 has to have a length corresponding to the above large distance, preventing reduction of the internal resistance of the battery.

Furthermore, in the fifth conventional battery, the peripheral edge portion of the sealing member 54 inevitably comes into contact with the edge of the opening of the battery case 51. Therefore, it is hard to put the fifth conventional battery into practical use.

SUMMARY OF THE INVENTION

Therefore, the present invention was made in view of the drawbacks of the aforementioned conventional techniques, and it is an object of the present invention to provide a battery that has a collecting structure enabling reduction of internal resistance of the battery and is fabricated easily, and a manufacturing method that suitably fabricates the battery with improved productivity.

In order to achieve the above object, a battery of the present invention includes a cylindrical metal battery case having a bottom and an electrode plate group accommodated in the battery case. The electrode plate group includes a strip-shaped positive electrode plate and a strip-shaped negative electrode plate that are spirally wound with a separator interposed therebetween. An opening at an upper end of the battery case is sealed by a sealing member with an insulation gasket interposed therebetween. The battery case has an enlarged portion formed above an upper end of the electrode plate group. Please note that the upper end of the electrode plate group is an end thereof on the side close to an opening end of the battery case. The battery case further has an annular supporting ledge formed on an inner surface of a lower end of the enlarged portion. A collector having one polarity is bonded to an end of the electrode plate having the one polarity that projects upward from the electrode plate group. To the collector of the one polarity, one end of a connection lead is bonded in an arrangement in which a notch formed at the one end of the connection lead is in agreement with a part of a hole edge of an electrolyte-injection hole at the center of the collector of the one polarity. Moreover, the other end of the connection lead, which is a tip end of a folded portion extending from the one end, is bonded to a portion of the sealing member, the portion being displaced from a vent opening at the center of the sealing member toward the folded portion of the connection lead. A peripheral edge portion of the sealing member is supported by the supporting ledge with the insulation gasket interposed therebetween, and is fastened in a horizontal direction with the insulation gasket interposed therebetween by performing caulking of the opening end of the battery case inward and reducing a diameter of the enlarged portion.

According to this battery, since the enlarged portion is provided near the opening end of the battery case and the supporting ledge for supporting the peripheral edge portion of the sealing member is formed on the inner surface of the lower end of the enlarged portion, an annular supporting portion formed by an annular groove in the conventional battery is eliminated. Thus, the electrode plate group further extends toward the opening end of the battery case by a length provided by omission of the conventional annular supporting portion, so that the upper end of the electrode plate group reaches a higher level. This greatly reduces a distance between the collector mounted to the upper end of the electrode plate group and the sealing member, as compared with that in the conventional battery, and also reduces the length of the connection lead for electrically connecting the collector and the sealing member greatly. Therefore, a collecting distance is reduced by a distance corresponding to the reduction of length of the connection lead, resulting in reduction of internal resistance of the battery and increase of an output of the battery.

Moreover, according to this battery, the height of the electrode plate group is increased by a volume corresponding to a useless space provided by inclusion of the annular supporting portion in the conventional battery, thereby increasing the volume of the electrode plate group. This increases the capacity of the battery. In addition, the connection lead is made as short as possible and does not require a notch or opening for avoiding interference of the connection lead with the vent opening of the sealing member, at the other end thereof. Thus, the connection lead has a simple rectangular shape and therefore is formed at a low cost. Furthermore, the connection lead will not close the vent opening even in a case where the connection lead is deformed and folded by being compressed in a vertical direction.

A method for manufacturing a battery of the present invention includes the steps of: accommodating a spiral electrode plate group in a cylindrical battery case having a bottom, the battery case having an enlarged portion formed close to an opening end thereof and an annular supporting ledge on an inner surface of a lower end of the enlarged portion, a collector of one polarity being bonded to an upper end of the spiral electrode plate group while a collector of another polarity is bonded to a lower end thereof; bonding one end of a connection lead to the collector of the one polarity in an arrangement in which a notch formed at the one end of the connection lead is in agreement with a part of a hole edge of an electrolyte-injection hole at a center of the collector of the one polarity, and then bending the connection lead at a portion near a portion bonded to the collector of the one polarity in such a manner that the connection lead stands vertically; bonding another end of the standing connection lead to a portion of a sealing member arranged parallel to the other end of the standing connection lead, the portion of the sealing member being below a vent opening positioned at a center of the sealing member; injecting electrolyte into the battery case through the electrolyte-injection hole of the collector of the one polarity; rotating the sealing member while the connection lead is bent to form a folded portion between the one end and the other end thereof, thereby arranging the sealing member parallel to an opening surface of the battery case to be opposed thereto, inserting the sealing member thus arranged into the opening of the battery case, and latching a peripheral edge portion of the sealing member on the supporting ledge of the battery case with an insulation gasket interposed therebetween; and fastening the peripheral edge portion of the sealing member in a horizontal direction with the insulation gasket interposed therebetween by performing caulking of an opening end of the battery case inward and reducing a diameter of the enlarged portion.

According to this manufacturing method, the annular supporting portion is not used. Thus, even if the sealing member is welded to the other end of the connection lead standing at a position away from the center of the electrode plate group and is then rotated from this state to a state in which the sealing member is arranged parallel to the opening surface of the battery case while the connection lead is bent, the sealing member never comes into contact with any portion of the battery case during the rotation and is placed in the predetermined state, although the sealing member arranged vertically is mounted at the position away from the center of the electrode plate group. Therefore, the sealing member is inserted into the opening of the battery case suitably while the collector and the sealing member are electrically connected by means of the short connection lead.

Moreover, in another battery of the present invention, the insulation gasket is mounted to the peripheral edge portion of the sealing member from a side opposite to the collector of the one polarity. The peripheral edge portion of the sealing member is supported by the supporting ledge with the insulation gasket interposed therebetween and is fastened in the horizontal direction by performing caulking of the opening end of the battery case inward and reducing the diameter of the enlarged portion.

According to this battery, the volume of the electrode plate group is increased by increasing the height of the electrode plate group by a length corresponding to a useless space formed by inclusion of the annular supporting portion in the conventional battery, thus increasing the capacity of the battery. Moreover, since the insulation gasket is mounted to the peripheral edge portion of the sealing member from the side opposite to the collector, this mounting of the insulation gasket is performed in a state where the sealing member is connected to the collector of one polarity with the connection lead interposed therebetween. That is, it is not necessary to insert the sealing member connected to the connection lead into the battery case through the opening of the battery case while rotating the sealing member around a folding line of the connection lead as in the conventional battery. Thus, the length of the connection lead is further reduced and the thickness thereof is made relatively thick. In accordance with this, further reduction of the internal resistance of the battery and further increase of the output thereof are achieved.

Another method for manufacturing a battery of the present invention comprises the steps of: bonding a collector of one polarity and a collector of another polarity to upper and lower ends of an electrode plate group, respectively; bonding a connection base portion of a connection lead to the collector of the one polarity before or after the bonding of the collector of the one polarity to the electrode plate group; bonding a connected portion of the connection lead to a lower surface of a peripheral edge portion of a filter portion of a sealing member by resistance welding, the connected portion being formed continuously from the connection base portion with a standing portion interposed therebetween; mounting an insulation gasket to the peripheral edge portion of the filter portion from a side opposite to the collector; accommodating the electrode plate group in a cylindrical battery case that has a bottom, and an enlarged portion close to an opening end and an annular supporting ledge formed on an inner surface of a lower end of the enlarged portion, and placing the peripheral edge portion of the filter portion on the supporting ledge with the insulation gasket interposed therebetween; caulking the opening end of the battery case inward and reducing a diameter of the enlarged portion to horizontally fasten and secure the peripheral edge portion of the sealing member with the insulation gasket interposed therebetween; injecting electrolyte into the battery case through an electrolyte-injection hole of the collector of the one polarity; and assembling the sealing member by bonding a cap terminal to the filter portion with a safety vent body interposed therebetween.

According to this manufacturing method, the insulation gasket is mounted to the peripheral edge portion of the filter portion of the sealing member after bonding of the filter portion to the connection lead bonded to the collector. Thus, the connection lead and the peripheral edge portion of the filter portion of the sealing member are bonded to each other by resistance welding because this bonding is performed before the mounting of the insulation gasket and the insertion of the sealing member into the battery case. Therefore, the resistance welding of the filter portion of the sealing member and the connection lead is performed stably with high precision, as compared with the conventional battery in which the sealing member is welded to the connection lead while being arranged vertically, thus providing excellent welding strength. This results in reduction of electric resistance at the welded portion. Moreover, according to this battery manufacturing method, it is not necessary to provide a folded portion in the connection lead. Thus, the connection lead can be further shortened.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 9A is a cross-sectional view of the battery of the third embodiment, showing a relative arrangement of respective parts corresponding to an assembly procedure, and FIG. 9B is a cross-sectional view of that battery while the positive and negative collectors and the positive lead are mounted to the electrode plate group;

FIGS. 10A, 10B, and 10C are cross-sectional views of the battery of the third embodiment, showing a process of attaching a filter portion of the sealing member, a process of attaching the insulation gasket, and a process of welding of the positive collector to a battery case after insertion of the electrode plate group into the battery case, respectively;

FIGS. 11A and 11B are cross-sectional views of the battery of the third embodiment, showing a preliminary sealing process and an electrolyte injection process, and a regular sealing process, respectively;

FIGS. 12A and 12B are a plan view and a cross-sectional view, respectively, showing a manufacturing process as an alternative of the manufacturing process shown in FIG. 9B;

FIGS. 18A through 18G are cross-sectional views sequentially showing manufacturing processes of the battery using the insulation gasket shown in FIGS. 17A and 17B;

DESCRIPTION OF THE PREFERRED EMBODIMENTS

Preferred embodiment of the present invention will now be described below with reference to the accompanying drawings. It should be noted that the embodiments described below do not intend to limit the scope of the present invention, but exemplify the invention.

Figure 1:
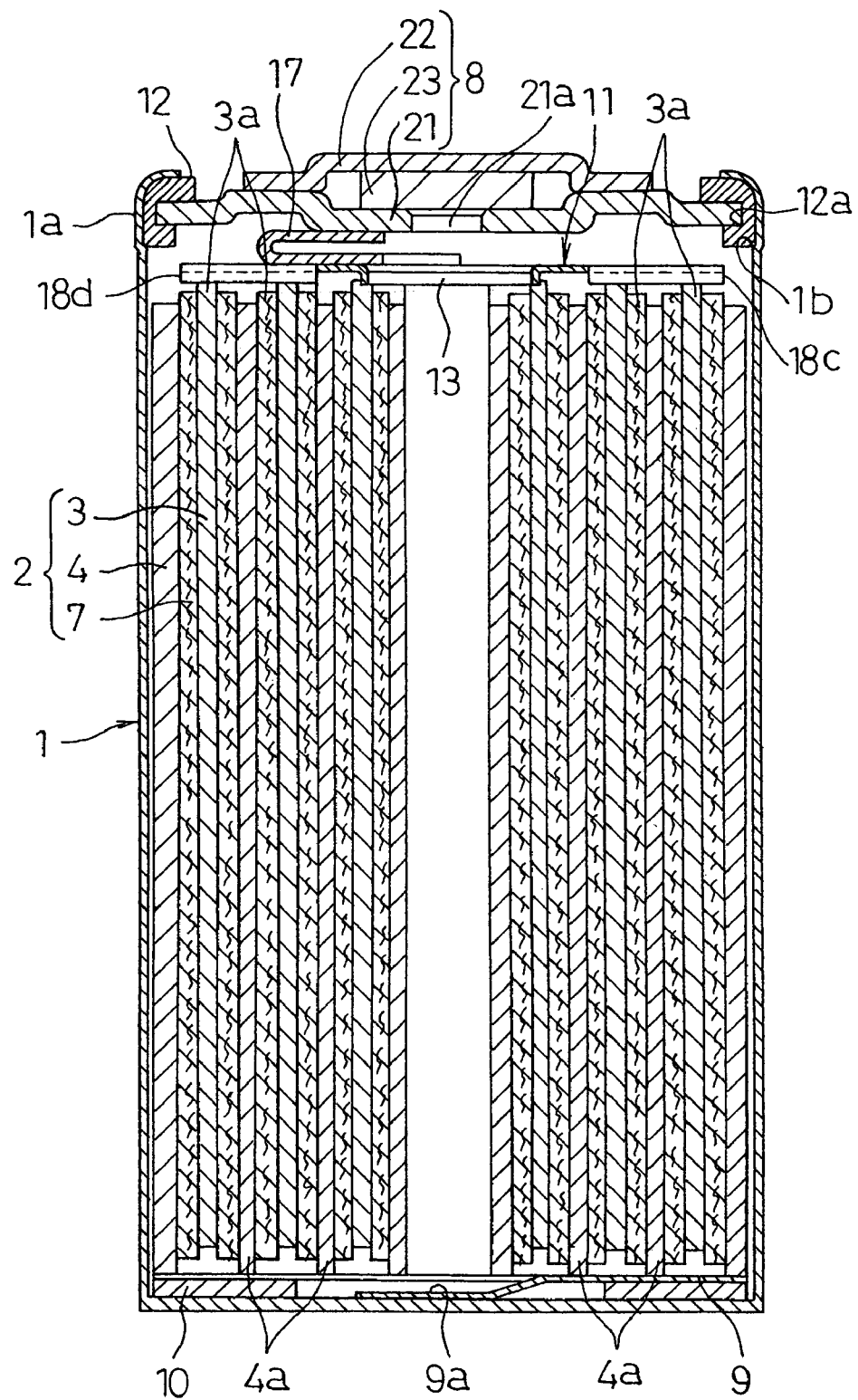
FIG. 1 is a vertical cross-sectional view of a battery according to a first embodiment of the present invention.

FIG. 1 is a vertical cross-sectional view of a battery according to a first embodiment of the present invention. This battery includes a cylindrical metal battery case 1 having a bottom; an electrode plate group 2 in which a strip-shaped positive electrode plate 3 and a strip-shaped negative electrode plate 4 are spirally wound with a separator 7 interposed therebetween; and a sealing member 8 that air-tightly closes an opening of the battery case 1 with an insulation gasket 12 interposed therebetween. The electrode plate group 2 is accommodated in the battery case 1 and forms together with electrolyte (not shown) an electric-power generation component.

The electrode plate group 2 is arranged in such a manner that one end 3*a* of the positive electrode plate 3 projects upward from the electrode plate group 2 while one end 4*a* of the negative electrode plate 4 projects downward from the electrode plate group 2. A negative collector 9 having a circular disk-like shape is welded to the end 4*a* of the negative electrode plate 4. Between the negative collector 9 and the bottom of the battery case 1 is inserted an elastic electric conductor 10 that is formed by a ring of foamed metal. This elastic electric conductor 10 absorbs variations in height of the electrode plate group 2 and contributes to vibration resistance and impact resistance of the battery. The negative collector 9 has a notch provided at its central portion, and a tongue-like negative collecting piece 9*a* is formed by raising a part of the negative collector 9 via that notch and orienting it downward. The negative collecting piece 9*a* is welded to the bottom surface of the battery case 1 by resistance welding. On the other hand, to the end 3*a* of the positive electrode plate 3, a positive collector 11 is welded by resistance welding.

The battery case 1 has an enlarged portion 1*a*, that has a slightly larger diameter than the cylindrical portion for accommodating the electrode plate group 2, near the opening and also has an annular supporting ledge 1*b* on the inner surface of the battery case 1 between the enlarged portion 1*a* and the cylindrical portion. The enlarged portion 1*a* is formed at a slightly higher level than the upper end of the electrode plate group 2 accommodated in the cylindrical portion of the battery case 1.

The sealing member 8 includes a filter portion 21 having a vent opening 21*a* for allowing gas generated inside the battery to escape, a cap-shaped positive terminal 22 that overlaps the filter portion 21 and is secured, and a safety vent body 23 made of rubber that is held and secured between the filter portion 21 and the cap-shaped positive terminal 22 and closes the vent opening 21a. While being caught on the supporting ledge 1b of the battery case 1 with an insulation gasket 12 interposed therebetween, a peripheral edge portion of the filter portion 21 is securely held by the enlarged portion 1a that has been caulked inward and processed to have a reduced diameter with the insulation gasket 12 interposed therebetween in such a manner that the peripheral edge of the filter portion 21 is fastened vertically and horizontally. The insulation gasket 12 made of resin has a supporting bottom surface 12a on which the peripheral edge portion of the filter portion 21 of the sealing member 8 is placed.

Figure 2A:
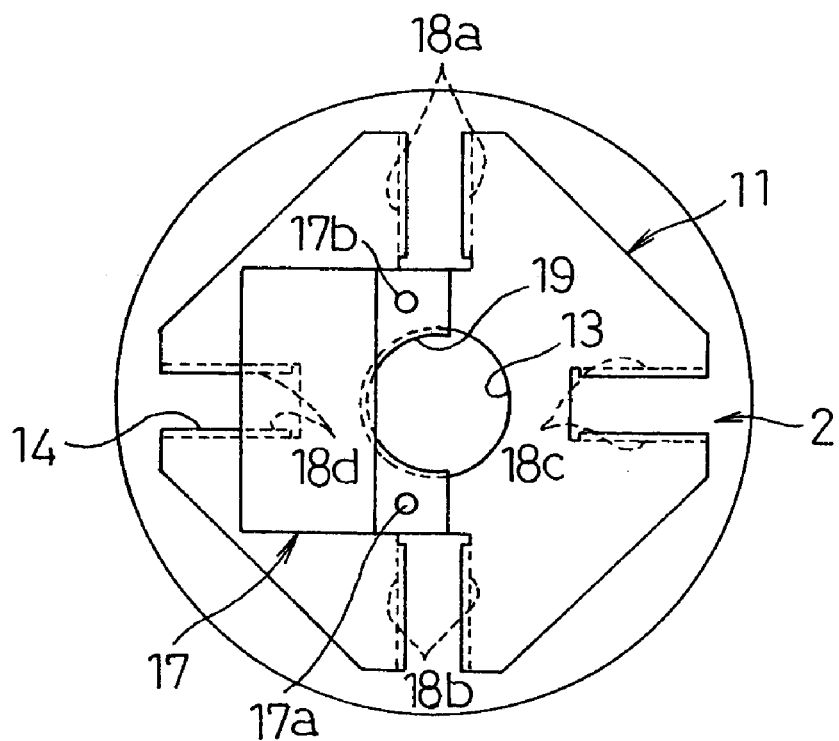
FIGS. 2A and 2B are a plan view and a cross-sectional view of the battery of the first embodiment, respectively, showing a relative arrangement of an electrode plate group, a positive collector, and a positive lead.
Figure 2B:
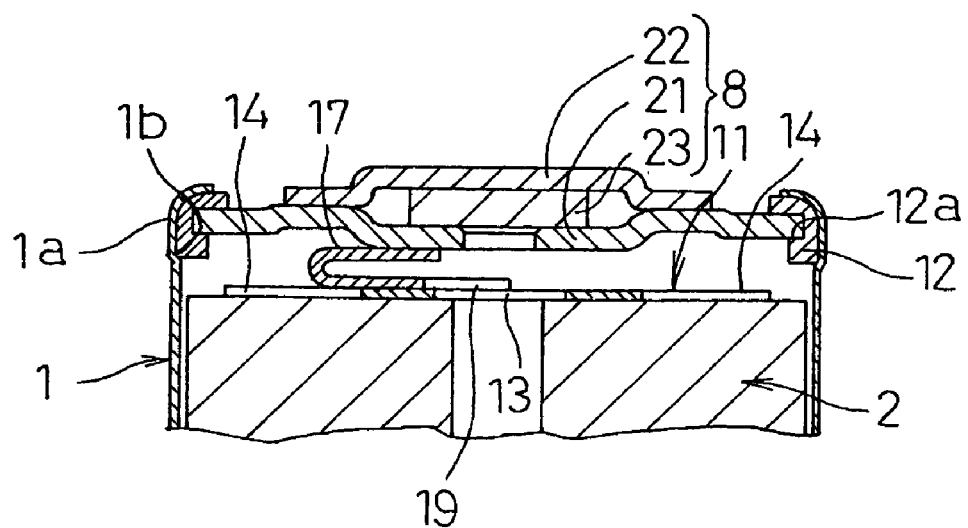

FIG. 2A is a plan view showing a relative arrangement of the electrode plate group 2, the positive collector 11, and a positive lead 17. FIG. 2B is a cross-sectional view of a portion corresponding to FIG. 2A. The positive collector 11 is formed by an electrically conductive plate having a substantially rectangular shape that is accommodated in the cross-sectional shape of the electrode plate group 2, and has a circular electrolyte-injection hole 13 at its center, corresponding to a central gap of the electrode plate group 2. The positive collector 11 also has four openings 14 which are formed by cut portions extending from four corners of the rectangular positive collector 11 to positions near the center thereof, respectively. Furthermore, burring projections 18a through 18d are formed integrally with the positive collector 11. The burring projections 18a through 18d are formed by bending sides of the respective openings 14 downward and perpendicularly. The positive collector 11 is welded to the positive electrode plate 3 by resistance welding while eight burring projections 18a through 18d intersect with the end 3a of the positive electrode plate 3 and partially bite into the end 3a.

Figure 3A:
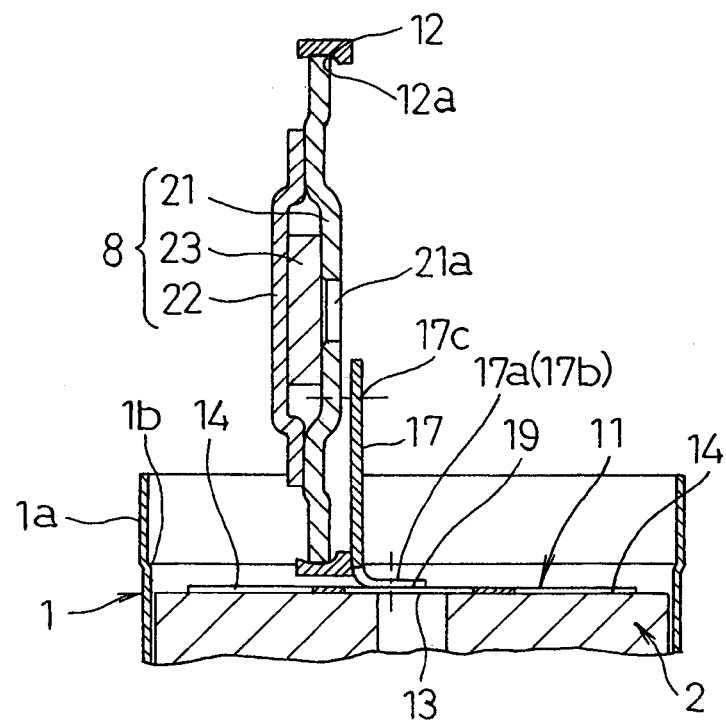
FIG. 3A is a cross-sectional view of the battery of the first embodiment during a manufacturing process.
Figure 3B:
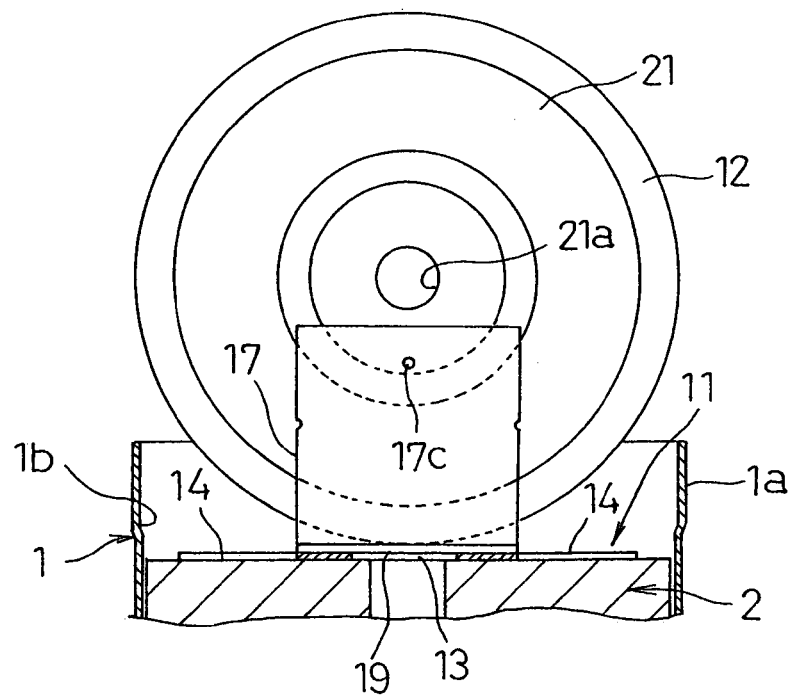
FIG. 3B is a right side view of the battery shown in FIG. 3A.
Figure 4:
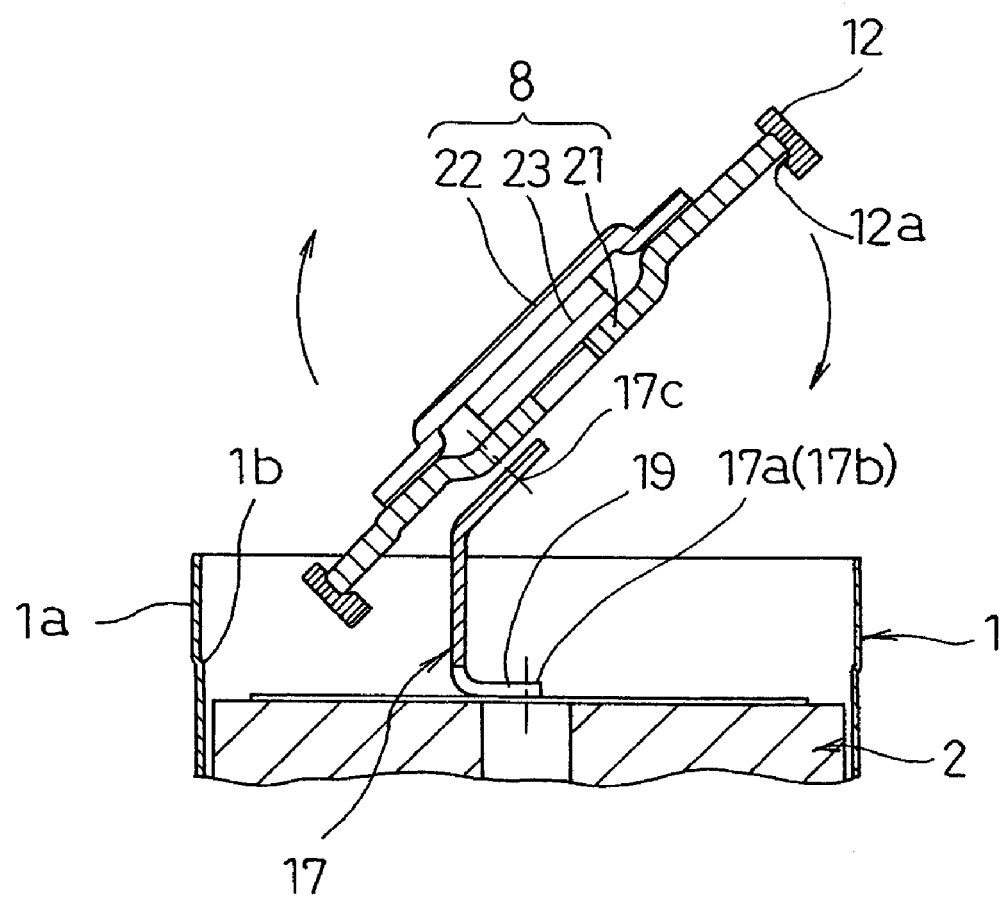
FIG. 4 is a cross-sectional view of the battery of the first embodiment when bending of the positive lead starts from the state shown in FIGS. 3A and 3B.

Next, the positive lead 17 for electrically connecting the positive collector 11 and the filter portion 21 of the sealing member 8 will be described with reference to FIGS. 3A, 3B, and 4. FIG. 3A is a cross-sectional view showing a manufacturing process in which the sealing member 8 is welded to one end of the positive lead 17 bonded to the positive collector 11 at the other end, FIG. 3B is a right side view of FIG. 3A, and FIG. 4 is a cross-sectional view showing a state when bending of the positive lead 17 has started from the state shown in FIGS. 3A and 3B. It should be noted that, in order to clearly show a welded portion at which the positive lead 17 and the sealing member 8 is welded, FIGS. 3A, 3B, and 4 illustrate the positive lead 17 and the sealing member 8 while they are away from each other for the sake of convenience. The positive lead 17 is a rectangular plate of electrically conductive material, as shown in FIGS. 3A and 3B, and includes a notch 19 at its one end to be connected to the positive collector 11. The notch 19 has a semi-circular shape corresponding to the electrolyte-injection hole 13 of the positive collector 11, as shown in FIG. 2A.

The positive lead 17 is placed so that the notch 19 formed on that end serving as a connection base portion is in agreement with a hole edge of the electrolyte-injection hole 13 positioned at the center of the electrode plate group 2, in such a manner that one end thereof overlap the positive collector 11. The positive lead 17 is bonded to the positive collector 11 by resistance welding at portions on both sides of the notch 19 at the one end. Then, the positive lead 17 is bent upward and perpendicularly at a portion near two welded portions 17a and 17b at the one end, so that an intermediate lead portion of the positive lead 17 stands vertically. The other end of the positive lead 17, i.e., a connected portion, is placed to overlap a portion of the filter portion 21 near the vent opening 21a of the filter portion 21 of the sealing member 8 and is bonded to the filter portion 21 by resistance welding.

Subsequently, as shown in FIG. 4, the positive lead 17 is bent at a portion near the welded portion 17c in the other end to rotate the sealing member 8 until the sealing member 8 is arranged parallel to the opening surface of the battery case 1. The sealing member 8 is inserted into the opening of the battery case 1 while being kept parallel to the opening surface. Then, the sealing member 8 is caught on the supporting ledge 1b of the battery case 1 while the peripheral edge portion of the filter portion 21 of the sealing member 8 engages with the supporting bottom surface 12a of the insulation gasket 12, and thereafter the opening end of the battery case 1 is caulked inward. Finally, the enlarged portion 1a of the battery case 1 is processed to have a reduced diameter. This enlarged portion 1a with the reduced diameter fastens the filter portion 21 in the horizontal direction.

Figure 19:
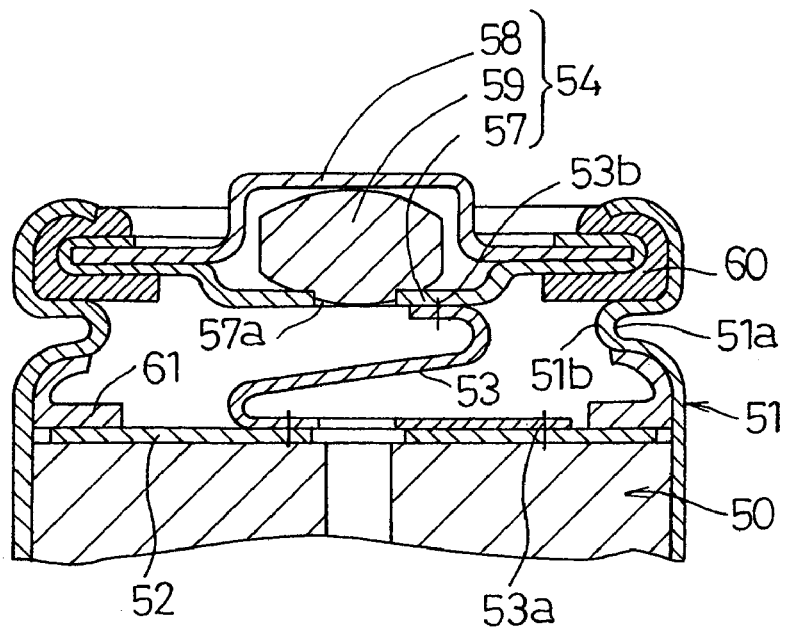
FIG. 19 is a cross-sectional view of a sealing portion of a conventional battery.
Figure 20:
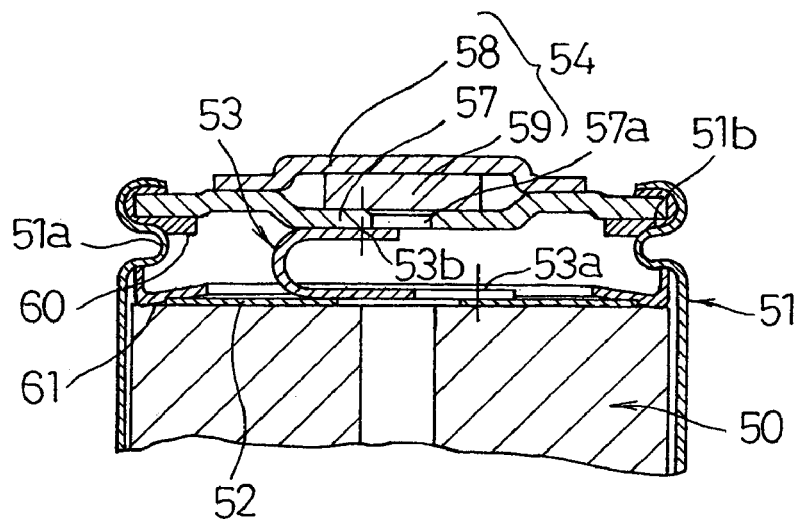
FIG. 20 is a cross-sectional view of a sealing portion of another conventional battery.

In this battery, the enlarged portion 1a is provided near the opening end of the battery case 1 and the supporting ledge 1b for supporting the filter portion 21 of the sealing member 8 is formed on the inner surface of the lower end of the enlarged portion 1a, thereby eliminating the use of the annular supporting portion 51b formed by the annular groove 51a in the conventional battery shown in FIG. 20. When the annular supporting portion 51b is not used, the ring-like upper insulation plate 61 for preventing the contact between the annular supporting portion 51b and the electrode plate group 50 is also unnecessary. Therefore, the supporting ledge 1b of the battery case 1 will be provided near the upper end of the electrode plate group 2 accommodated in the battery case 1. In other words, according to the battery of the present embodiment, the upper end of the electrode plate group 2 extends higher toward the opening end of the battery case 1 by the length corresponding to the conventional annular supporting portion 51b. Therefore, the distance between the positive collector 11 attached to the upper end of the electrode plate group 2 and the filter portion 21 of the sealing member 8 is largely shortened as compared with the conventional battery, as is apparent from comparison of FIG. 2B with FIGS. 19 and 20. Accordingly, the positive lead 17 for electrically connecting the positive collector 11 and the filter portion 21 is largely shortened.

As a result, the collecting distance in this battery is reduced by a distance corresponding to the reduction of the length of the positive lead 17, and therefore the battery reduces its internal resistance largely so as to achieve higher output. Moreover, the volume of the electrode plate group 2 is increased by increasing the height of the electrode plate group 2 by the height corresponding to a useless space formed by the provision of the annular supporting portion 51b in the conventional battery. This increase of the volume of the electrode plate group 2 also increases the capacity of the battery.

In addition, in the battery of the present embodiment, the annular supporting portion 51b does not exist. Thus, even if the sealing member 8 is welded to the other end of the positive lead 17 that is made to stand vertically at a position on one side (left side in FIG. 3A) of the center of the electrode plate group 2 as shown in FIG. 3A, and is then rotated by bending the positive lead 17 until the sealing member 8 is arranged parallel to the opening of the battery case 1, the lower end of the sealing member 8 will not come into contact with any portion of the battery case 1 although the sealing member 8 arranged vertically is mounted at a position displaced from the center of the electrode plate group 2 toward one side. On the other hand, in the conventional battery, in order to rotate the sealing member 54 without contact between the lower end of the sealing member 54 and the annular supporting portion 51b, it was necessary to weld the sealing member 54 to the positive lead 53 while the sealing member 54 was arranged vertically at a position corresponding to the center of the electrode plate group 50.

In this manner, the positive lead 17 is bonded to the positive collector 11 in a relative arrangement in which one end of the positive lead 17 is positioned to be displaced from the center of the electrode plate group 2 toward one side, as shown in FIG. 3A, and is bonded to the filter portion 21 in a relative arrangement in which the other end is arranged at a position below the vent opening 21a of the sealing member 8 that is arranged vertically, as shown in FIG. 3B. Thus, the length of the positive lead 17 is reduced, and the shape of the positive lead 17 becomes a simple rectangular shape because it is unnecessary to form a notch or opening at its other end in order to prevent interference with the vent opening 21a of the filter portion 21. This is advantageous to reduce the cost. Moreover, in the battery of the present embodiment, the positive lead 17 will not close the vent opening 21a, even if the positive lead 17 is compressed in the vertical direction from the state shown in FIG. 2B and is folded.

Figure 5A:
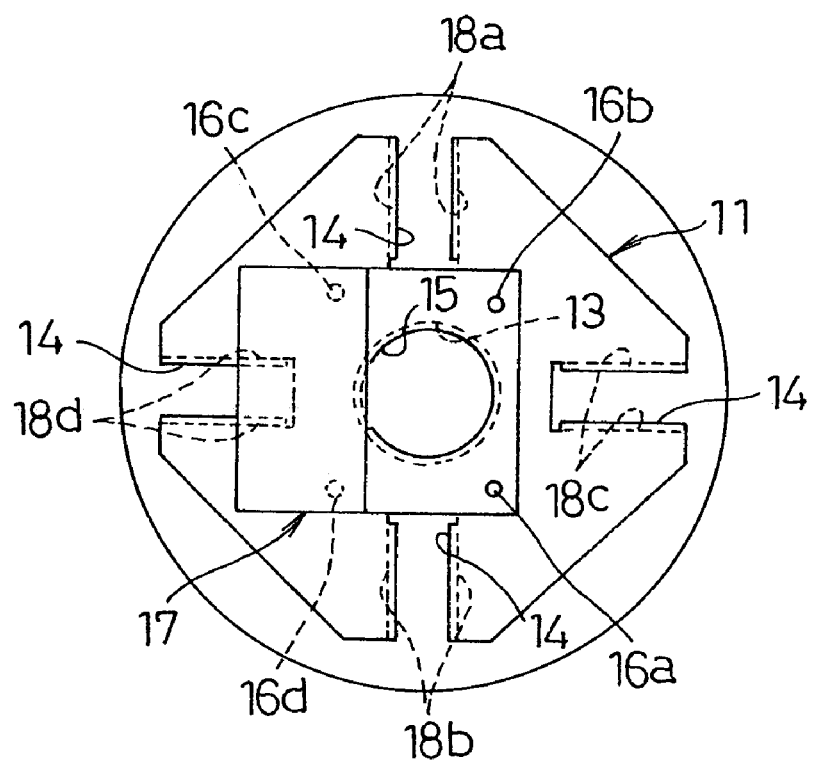
FIGS. 5A and 5B are a plan view and a cross-sectional view of a battery according to a second embodiment of the present invention, respectively, showing a relative arrangement of an electrode plate group, a positive collector, and a positive lead.
Figure 5B:
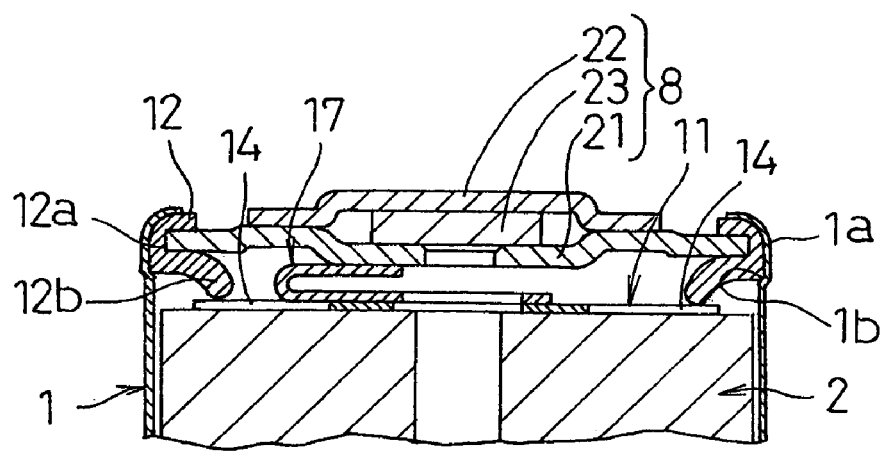

FIG. 5A is a plan view showing a relative arrangement of the electrode plate 2, the positive collector 11, and the positive lead 17 in the battery according to a second embodiment of the present invention. FIG. 5B is a cross-sectional view corresponding to FIG. 5A. In FIGS. 5A and 5B, the components that are the same as or similar to those in FIGS. 2A and 2B are labeled with the same reference numerals and redundant description is omitted. Although the positive lead 17 shown in FIGS. 2A and 2B has the semi-circular notch 19, the positive lead 17 of the battery shown in FIGS. 5A and 5B has a circular hole 15 having a slightly smaller diameter than that of the electrolyte-injection hole 13 of the positive collector 11. Moreover, in the positive lead 17 of the present embodiment, four welded portions 16a through 16d for welding of the positive lead 17 to the positive collector 11 are provided at four positions surrounding the circular hole 15, respectively. In addition, a pressing piece 12b is formed integrally with the insulation gasket 12 in such a manner that the pressing piece 12b extends obliquely downward from the supporting bottom surface 12a. Since the pressing piece 12b is formed integrally with the insulation gasket 12, the elastic electric conductor 10 shown in FIG. 1 is not necessary, thus reducing the cost. Furthermore, since the pressing piece 12b formed integrally with the insulation gasket 12 securely holds the electrode plate group 2 with the positive collector 11 interposed therebetween in the battery of the present embodiment, vibration resistance and impact resistance are improved.

In a case of the positive lead 17 shown in FIGS. 2A and 2B, current paths between two welded portions 17a and 17b and the burring projections 18a and 18b are short, whereas current paths between the other two burring projections 18c and 18d and the welded portions 17c and 17d are long. On the other hand, in the positive lead 17 of the battery shown in FIGS. 5A and 5B, four welded portions 16a through 16d are provided for the four burring projections 18a through 18d, respectively. Thus, each of current paths between the welded portions and the burring projections is short. Therefore, the internal resistance of the battery is further reduced.

Figure 6:
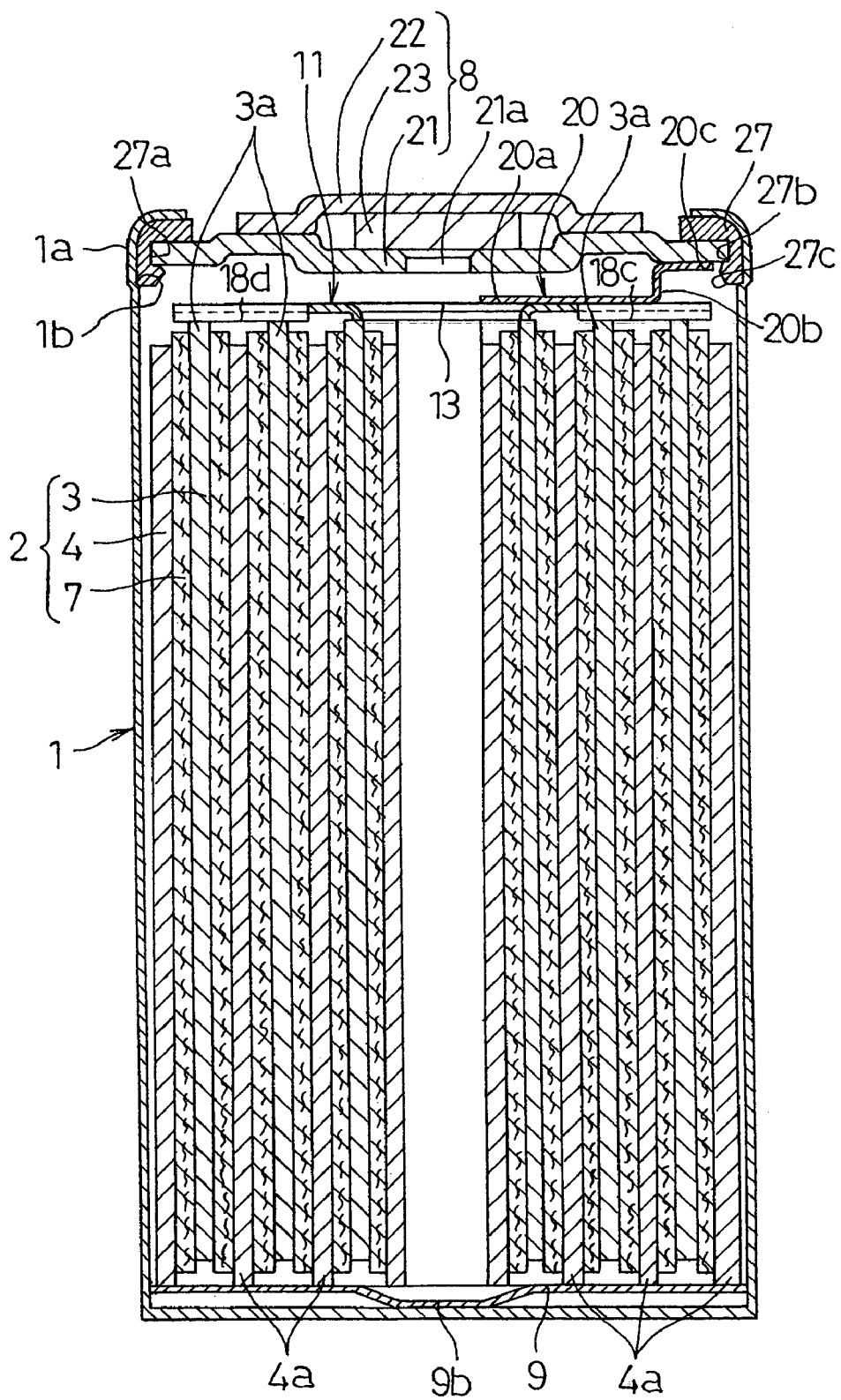
FIG. 6 is a vertical cross-sectional view of a battery according to a third embodiment of the present invention.

FIG. 6 is a vertical cross-sectional view of a battery according to a third embodiment of the present invention. In FIG. 6, the components that are the same as or similar to those in FIG. 1 are labeled with the same reference numerals, and redundant description will be omitted but only differences between the structure shown in FIG. 6 and that shown in FIG. 1 will be described. In the third embodiment, shapes of an insulation gasket 27 and a positive lead 20 are characteristic. The details of the insulation gasket 27 and the positive lead 20 will be described later. The negative collector 9 is formed by a disc spring having an elastic connection portion 9b that expands downward from a central region of the disc-like negative collector 9. The elastic connection portion 9b is welded to the bottom of the battery case 1 by resistance welding. Due to the provision of the elastic connection portion 9b, the elastic electric conductor 10 shown in FIG. 1 is eliminated.

Figure 7A:
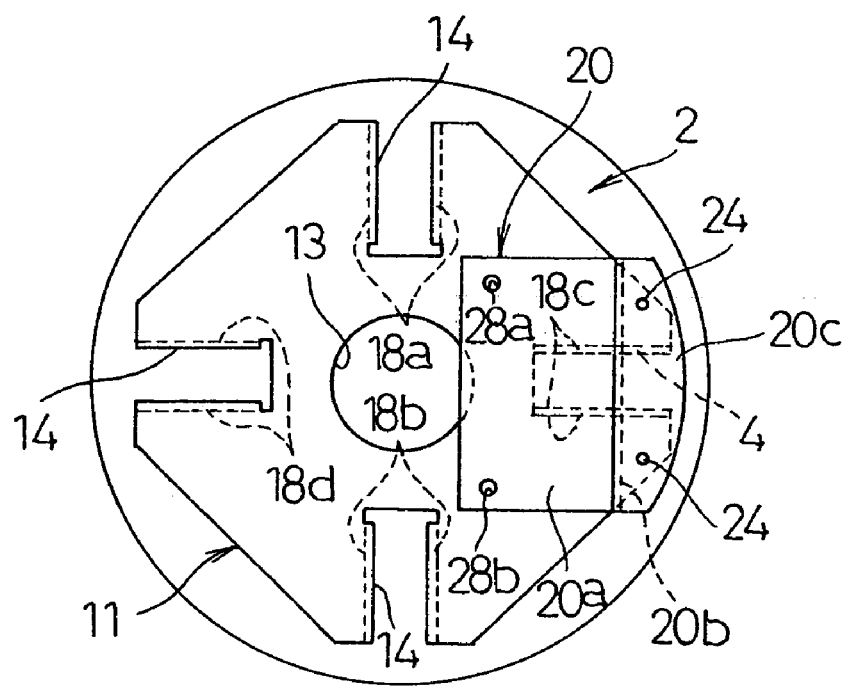
FIGS. 7A and 7B are a plan view and a cross-sectional view of the battery of the third embodiment of the present invention, respectively, showing a relative arrangement of an electrode plate group, a positive collector, and a positive lead.
Figure 7B:
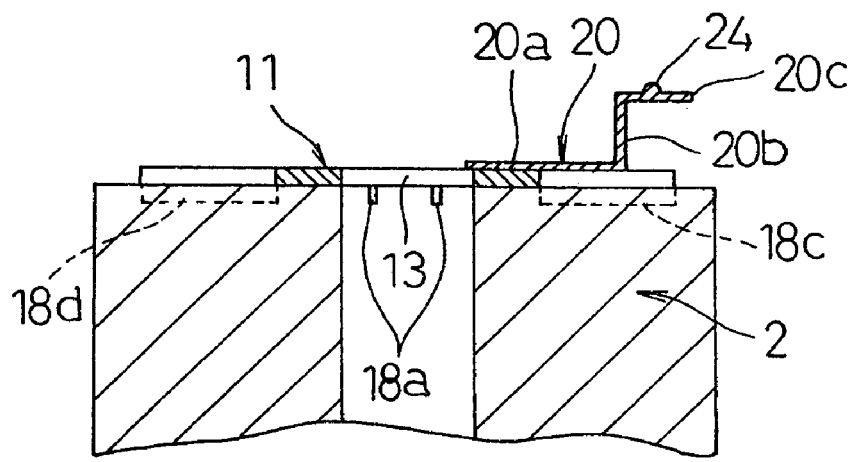

FIG. 7A is a plan view showing a relative arrangement of the electrode plate group 2, the positive collector 11, and the positive lead 20. FIG. 7B is a cross-sectional view of a portion corresponding to FIG. 7A. The positive collector 11 is formed by a plate of electrically conductive material having a substantially rectangular shape that is accommodated within a cross-sectional shape of the electrode plate group 2, and has a circular electrolyte-injection hole 13 at its center, corresponding to a central circular hole of the electrode plate group 2. The positive collector 11 also has four openings 14 extending from four corners of the rectangular positive collector 11 to positions near the center thereof, respectively. Furthermore, burring projections 18a through 18d are formed integrally with the positive collector 11. The burring projections 18a through 18d are formed by bending sides of the respective openings 14 downward and perpendicularly. The positive collector 11 is welded to the positive electrode plate 3 by resistance welding while four pairs of burring projections 18a through 18d intersect with the end 3a of the positive electrode plate 3 and partially bite into the end 3a.

The positive lead 20 for electrically connecting the positive collector 11 and the filter portion 21 of the sealing member 8 to each other is made of a substantially rectangular conductive plate, and is bent perpendicularly at its two portions. As a result, in the positive lead 20, a standing portion 20b extends from a connection base portion 20a to be welded to the positive collector 11 upward in a direction perpendicular to the connection base portion 20a, and a connected portion 20c extends parallel to the connection base portion 20a from the upper end of the standing portion 20b toward the peripheral edge of the sealing member 8. The connected portion 20c has two projections 24 at two portions thereof and is welded to the lower surface of the filter portion 21 of the sealing member 8 with the projections 24 by resistance welding.

Figure 8A:
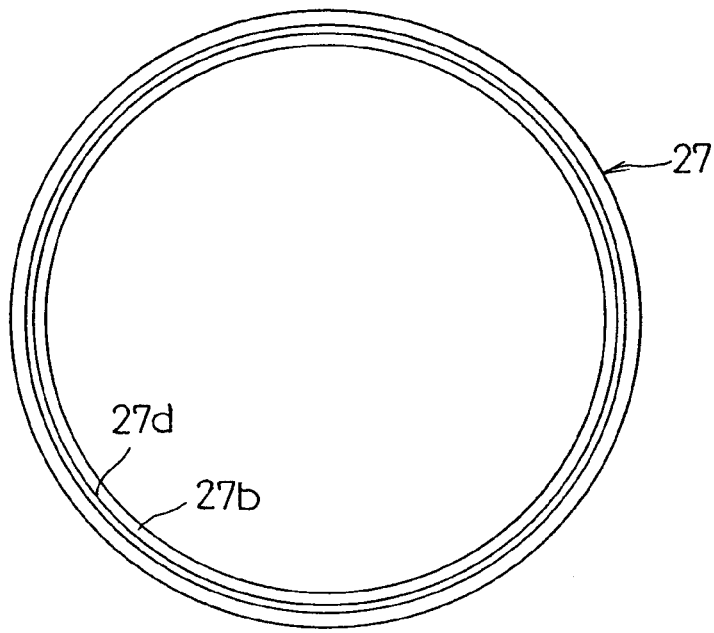
FIGS. 8A and 8B are a plan view and a vertical cross-sectional view of an insulation gasket in the battery of the third embodiment.
Figure 8B:
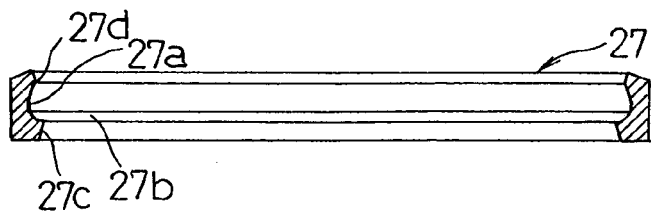
Figure 8C:
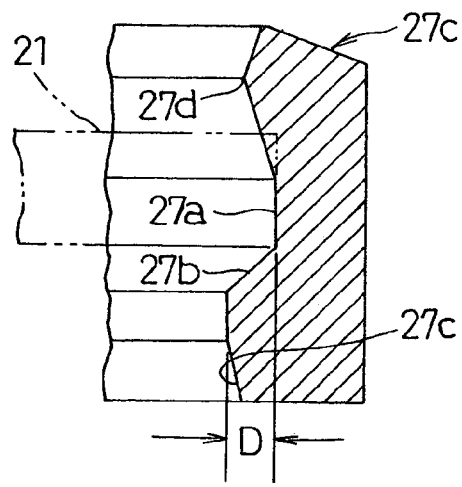
FIG. 8C is an enlarged view of a part of FIG. 8B.
Figure 8D:
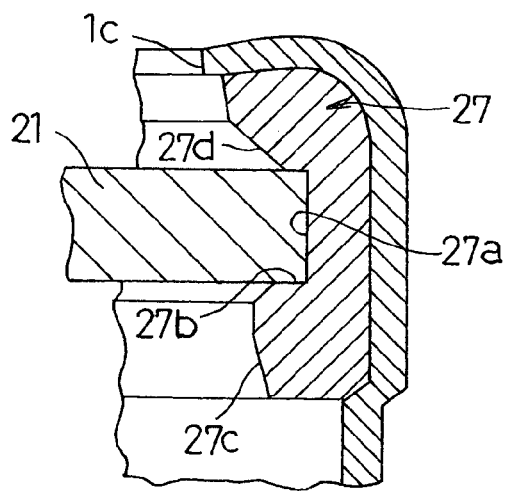
FIG. 8D is an enlarged view of a part of FIG. 8B while a sealing member is attached.

FIGS. 8A and 8B are a plan view and a vertical cross-sectional view of the insulation gasket 27 in the battery shown in FIG. 6, respectively. FIG. 8C is an enlarged view of a part of FIG. 8B, and FIG. 8D is an enlarged view of a part of the insulation gasket 27 to which the filter portion 21 of the sealing member 8 has been attached. The insulation gasket 27 is a molded part made of synthetic resin, which is a short cylindrical shape having the outer diameter substantially equal to the inner diameter of the enlarged portion 1a of the battery case 1. As clearly shown in FIG. 8C, the insulation gasket 27 includes a holding inner wall face 27a having the inner diameter substantially equal to the outer diameter of the filter portion 21 of the sealing member 8; a supporting bottom portion 27b projecting inward from the lower end of the holding inner wall face 27a at an angle; a guide tapered side 27c that broadens downward from a portion below the supporting bottom portion 27b; and a latch projection 27d that projects inward from the upper end of the holding inner wall face 27a and has the inner diameter slightly smaller than the outer diameter of the filter portion 21. The holding inner wall face 27a, the supporting bottom portion 27b, the guide tapered side 27c, and the latch projection 27d are formed integrally. The projection length D of the supporting bottom portion 27b from the holding inner wall face 27a is set in a range from 0.2 mm to 0.4 mm, which allows the attachment of the insulation gasket 27 from one side of the sealing member 8 that is an opposite side to the electrode plate group 2. The detailed description of FIG. 8D will be described later.

The battery using the insulation gasket shown in FIGS. 8A through 8D also provides the same advantageous effects as those described in the first embodiment. More specifically, since the supporting ledge 1b for supporting the filter portion 21 of the sealing member 8 is formed to horizontally fasten the battery case 1 in this battery, the annular supporting portion 51b formed by the annular groove 51a in the conventional battery, as well as the ring-like upper insulation plate 61, is eliminated. Thus, the upper end of the electrode plate group 2 further extends toward the opening end of the battery case 1 by a distance provided by omission of the conventional annular supporting portion 51b, thereby increasing the height of the electrode plate group 2. In addition, the length of the positive lead 20 for electrically connecting the positive collector 11 and the filter portion 21, especially the length of the standing portion 20b, is largely reduced. Therefore, the collecting distance in this battery is reduced by a distance corresponding to the reduction of the length of the positive lead 20, resulting in great reduction of the internal resistance of the battery and increased output of the battery. Moreover, since the height of the electrode plate group 2 is increased by the height corresponding to a useless space provided by the provision of the annular supporting portion 51b in the conventional battery, the volume of the electrode plate group 2 is increased. This increase of the volume increases the capacity of the battery.

Moreover, the battery of the third embodiment has the following advantageous effect in addition to the advantageous effects that are the same as those described in the first embodiment. Since the insulation gasket 27 has a shape that allows the attachment of the insulation gasket 27 to the sealing member 8 from the side opposite to the electrode plate group 2, the insulation gasket 27 is mounted to the sealing member 8 that has been already welded to the positive lead 20. Thus, unlike a case where the sealing member bonded to the positive lead drawn from the opening of the battery case is inserted into the battery case while being rotated as in the conventional battery, it is unnecessary to bend the positive lead 20 in the manufacturing process of the battery. Thus, the positive lead 20 will be further shortened.

Next, the manufacturing process of the battery of the third embodiment will be described with reference to FIGS. 9A through 11B. FIG. 9A shows a relative arrangement of the respective components to be assembled. In the first process, as shown with an arrow in FIG. 9A, the negative collector 9 is brought into contact with the end 4a (see FIG. 6) of the negative electrode plate 4 of the electrode plate group 2 and is welded to the end 4a by resistance welding. In addition, the respective burring projections 18a through 18d of the positive collector 11 are brought into contact with the end 3a (see FIG. 6) of the positive electrode plate 3 of the electrode plate group 2 and are welded to the end 3a by resistance welding. Further, the connection base portion 20a of the positive lead 20 is positioned and arranged with respect to the positive collector 11 in accordance with the relative arrangement shown in FIG. 7A, and thereafter the positive lead 20 is welded at two portions to the positive collector 11. In this manner, the positive lead 20 is connected to the positive electrode plate 3 with two welded portions 28a and 28b and the positive collector 11. Thus, as shown in FIG. 9B, the attachment of the positive and negative collectors 11 and 9 and the positive lead 20 to the electrode plate group 2 has been completed.

The resistance welding of the negative collector 9 and the positive collector 11 mentioned above is performed by using a special welding jig (not shown). In a case of welding the positive collector 11 to the end 3a of the positive electrode plate 3, since each of eight burring projections 18a through 18d extends in the radial direction of the electrode plate group 2, the burring projections 18a through 18d are opposed to the positive electrode plate 3 at relative positions at which they intersect with the end 3a of the positive electrode plate 3 at substantially right angles. Thus, by performing resistance welding for each opening 14 while a pair of welding electrodes are brought into contact with two flat portions on both sides of that opening 14 with a pressure applied to the welding electrodes, a reactive current flowing in the surface of the positive collector 11 between the electrodes in that pair is reduced because of the existence of the opening 14. On the other hand, welding currents flowing through the intersections of the burring projections 18a through 18d and the end 3a of the positive electrode plate 3 are increased. Thus, the burring projections 18a through 18d are melted while biting into the end 3a of the positive electrode plate 3, and therefore the positive collector 11 is securely welded to the end 3a. In this manner, the electric resistances at the welded portions at which the burring projections 18a through 18d are welded to the end 3a of the positive electrode plate 3 are reduced, thus reducing the internal resistance of the battery.

Subsequently, as shown in FIG. 10A, the connected portion 20c of the positive lead 20 and the peripheral edge portion of the filter portion 21 of the sealing member 8 are bonded to each other by resistance welding with the projections 24 shown in FIGS. 7A and 7B. The resistance welding of the positive lead 20 and the filter portion 21 is possible because it is performed when the insulation gasket 27 has not been attached yet and before the assembly is inserted into the battery case 1. More specifically, because the insulation gasket 27 has not been attached and the assembly has not been inserted into the battery case 1, the resistance welding is performed via the projections 24 while one welding electrode 29 is in contact with the lower surface of the connected portion 20c of the positive lead 20; the other welding electrode 30 is in contact with the upper surface of the peripheral edge portion of the filter 21; and an insulation guide 31 is interposed between the peripheral end face of the filter portion 21 and the welding electrode 29.

Figure 22:
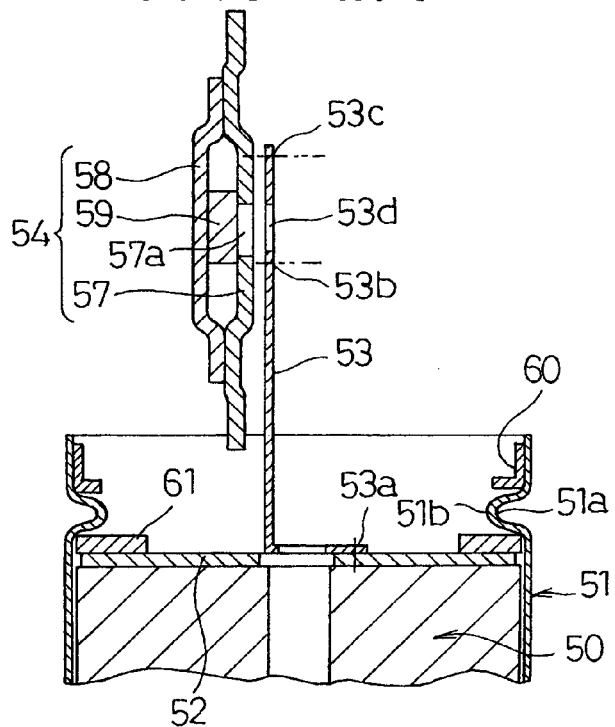
FIG. 22 is a cross-sectional view showing a manufacturing process of still another conventional battery.
Figure 23:
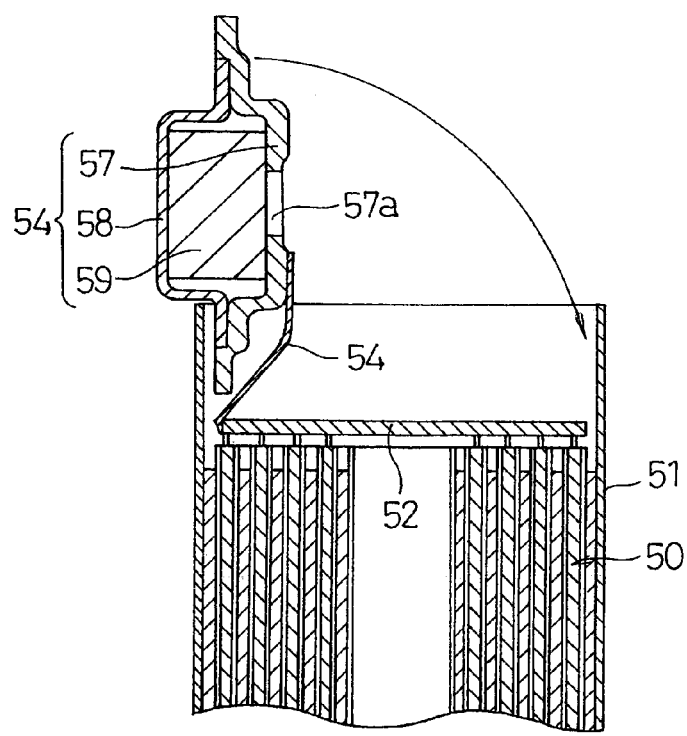
FIG. 23 is a cross-sectional view showing a manufacturing process of still another conventional battery.
Figure 24A:
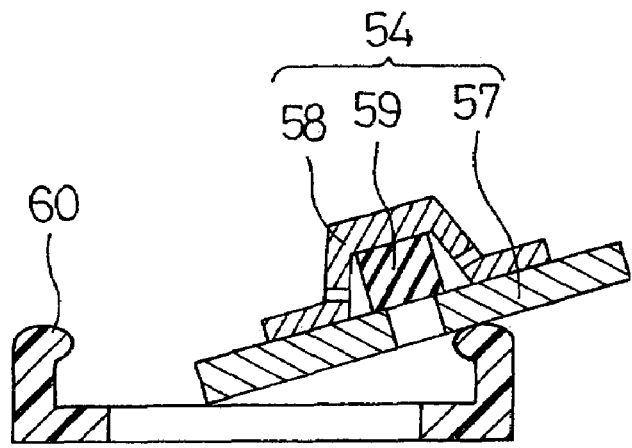
FIGS. 24A through 24C are cross-sectional views sequentially showing typical processes for attaching a sealing member to an insulation gasket in the conventional battery.
Figure 24B:
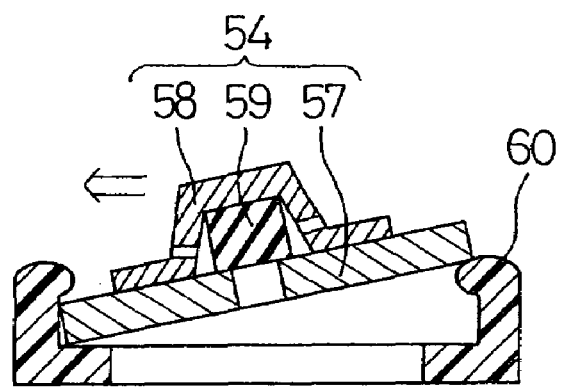
Figure 24C:
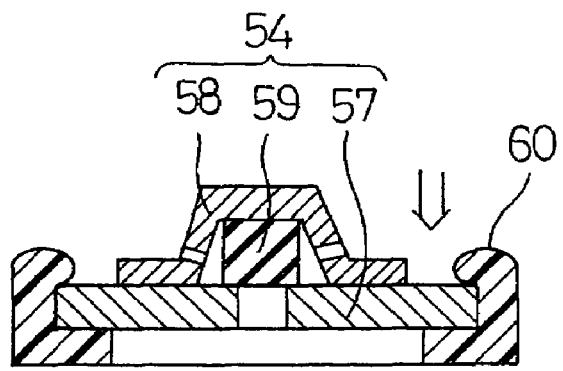

Thus, the resistance welding mentioned above is performed stably with higher precision so as to achieve excellent welding strength, as compared with a case where the sealing member 54 arranged vertically is welded to the positive lead 53, as shown in FIGS. 22 and 23. Moreover, one welding electrode 29 has an arc-like shape obtained by dividing the peripheral edge portion of the filter portion 21 into three portions, whereas the other welding electrode 30 has a ring-like shape. Thus, both a contact area between the welding electrode 29 and the connected portion 20c of the positive lead 20 and a contact area between the other welding electrode 30 and the peripheral edge portion of the filter portion 21 increase largely. Therefore, the other welding electrode 30 receives a total load of the one welding electrode 29, the filter portion 21, and the connected portion 20c of the positive lead 20 while the connected portion 20c of the positive lead 20 and the filter portion 21 are surely in contact with each other under pressure. This allows the resistance welding to be performed more stably.

Then, as shown in FIG. 10B, the insulation gasket 27 is mounted to the peripheral edge portion of the filter portion 21 that has been bonded to the positive lead 20 in the above-described manner. The insulation gasket 27 is pressed toward the peripheral edge portion of the filter portion 21 from the side of the filter portion 21, that is opposite to the positive collector 11, i.e., from above, thereby the supporting bottom portion 27b of the insulation gasket 27 made of nylon is deformed and enlarged while the peripheral edge portion of the filter portion 21 slides on the guide tapered side 27c. In this manner, the peripheral edge portion of the filter portion 21 is gradually inserted into an internal space of the insulation gasket 27. At a time at which the lower end of the peripheral edge portion of the filter portion 21 is coincident with a boundary between the supporting bottom portion 27b and the holding inner wall surface 27a of the insulation gasket 27, as shown with chain double-dashed line in FIG. 8C, the insulation gasket 27 is mounted to the filter portion 21 by interposing the peripheral edge portion of the filter portion 21 from above and beneath with a restoring force generated by deformation of the latch projection 27d and the supporting bottom portion 27b in which their diameters are increased.

The length of the inward projection D of the supporting bottom portion 27b from the holding inner wall face 27a may be set in a range from 0.2 mm to 0.4 mm, as described above. In this case, in spite of differences between types of batteries or material of the insulation gasket 27, it is possible to press and mount the insulation gasket 27 to the filter portion 21 from above.

The electrode plate group 2 with the positive and negative collectors 11 and 9, the positive lead 20, and the filter portion 21 mounted thereto is inserted into the battery case 1, as shown in FIG. 10C. In this state, the insulation gasket 27 is placed on and supported by the annular supporting ledge 1b of the battery case 1. Then, an elongate welding electrode 32 is inserted into the circular hole at the center of the electrode plate group 2 from above through the vent opening 21a of the filter portion 21 and the electrolyte-injection hole 13 of the positive collector 11, and thereafter resistance welding is performed while the elastic connection portion 9b of the negative collector 9 is pressed against the bottom of the battery case 1. Thus, the negative collector 9 is welded to the bottom of the battery case 1.

Then, as shown in FIG. 11A, the opening end of the battery case 1 is caulked inward, and thereafter the enlarged portion 1a of the battery case 1 is subjected to a process for reducing the diameter. In this process, the diameter of the enlarged portion 1a is reduced by pushing and inserting the battery case 1 into a cylinder for diameter reduction that has a slightly smaller inner diameter than the outer diameter of the enlarged portion 1a, from the bottom of the battery case 1. In the caulking process, the caulked opening end of the battery case slightly presses down the electrode plate group 2 via the filter portion 21, the positive lead 20, and the positive collector 11.

In this manner, the electrode plate group 2 is vertically fastened so as not to move in the direction of the axis of the battery case 1, i.e., the vertical direction, so that it is secured while being compressed by about 0.2 mm, for example.

Thus, impact resistance and vibration resistance are largely improved. Moreover, the insulation gasket 27 is deformed by a pressing force applied from above by the opening end of the battery case 1 that has been caulked, so that the supporting bottom portion 27b and the latch projection 27d are pressed against the upper and lower surfaces of the peripheral edge portion of the filter portion 21, respectively, as shown in FIG. 8D. On the other hand, the negative collector 9 changes its shape by plastic deformation so as to flatten out the elastic connection portion 9b because it receives a pressing force applied by the electrode plate group 2, thereby the negative collector 9 absorbs variations in heights of the ends 3a and 4a of the positive and negative electrode plates 3 and 4. Furthermore, by reducing the diameter of the enlarged portion 1a of the battery case 1, the filter portion 21 of the sealing member 8 is horizontally fastened with the insulation gasket 27 interposed therebetween, so as to be secured by a significantly robust supporting structure.

Then, a predetermined amount of electrolyte is poured into the battery case 1 that has been processed in a preliminary sealing process including caulking of the opening end of the battery case 1 and diameter reduction for the enlarged portion 1a, from an injection nozzle 33 through the vent opening 21a of the filter portion 21 and the electrolyte-injection hole 13 of the positive collector 11. This injection process is performed in a stable state in which the filter portion 21 and the positive collector 11 are secured to the battery case 1 connected to the electrode plate group 2, and therefore is performed significantly efficiently.

Finally, as shown in FIG. 11B, the filter portion 21 and the cap-shaped positive terminal 22 of the sealing member 8 are welded to each other while the cap-shaped positive terminal 22 is placed on the filter portion 21 with the safety vent body 23 interposed therebetween. Thus, assembly of the sealing member 8 has been completed, and this sealing member 8 completely seals the opening of the battery case 1.

Figure 21A:
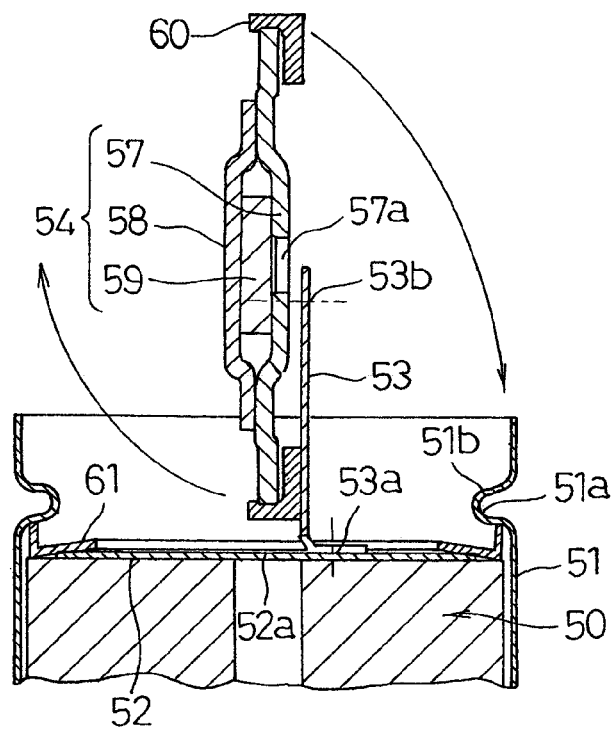
FIGS. 21A and 21B are a cross-sectional view and a right side view showing a manufacturing process of the battery shown in FIG. 19, respectively.
Figure 21B:
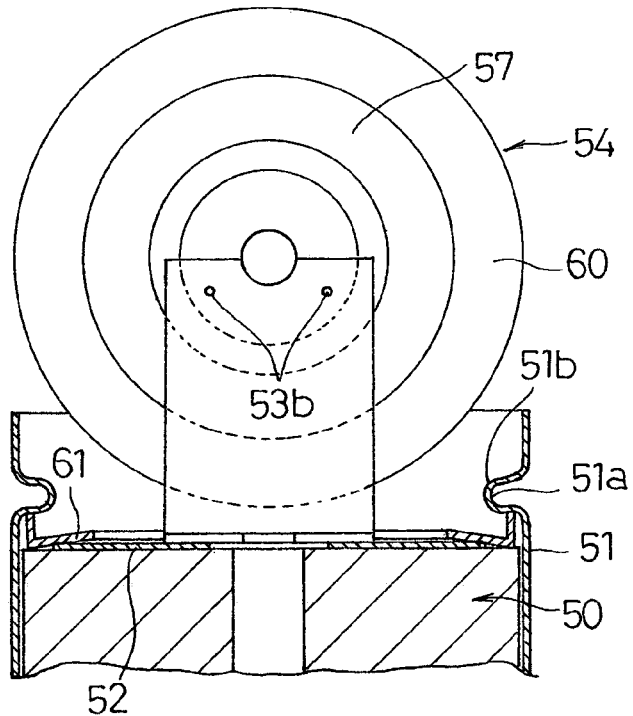

In the manufacturing method of the battery of the present embodiment, it is possible to mount the insulation gasket 27 to the filter portion 21 that has been welded to the positive lead 20 by pressing the insulation gasket 27 against the filter portion 21 from above. Thus, the filter portion 21 and the positive lead 20 are bonded to each other by resistance welding significantly stably prior to the mounting of the insulation gasket 27. This resistance welding can be performed with higher precision so as to provide excellent welding condition, as compared with a case in which the sealing member 54 arranged vertically is welded to the positive lead 53, as shown in FIGS. 21A, 21B and 22, and a case of laser spot welding. Therefore, electric resistance at the welded portion is reduced.

Moreover, the electrode plate group 2 to which the positive lead 20 and the filter portion 21 of the sealing member 8 have been mounted in advance is inserted into the battery case 1, and thereafter the sealing member 8 is assembled by bonding the cap-shaped positive terminal 22 to the filter portion 21 with the safety vent body 23 interposed therebetween. Thus, it is not necessary to bend the positive lead 20 in the manufacturing process of the battery, unlike the manufacturing process of the conventional battery in which the sealing member 54 bonded to the positive lead 53 drawn out from the opening of the battery case 51 is inserted into the battery case 1 while being rotated. That is, the positive lead 20 is shaped in advance to have the connection base portion 20a, the standing portion 20b, and the connected portion 20c. Therefore, as the positive lead 20, it is possible to use a relatively thick plate-like member. This further contributes to reduction of the internal resistance of the battery.

The synergistic effect that the positive lead 20 is shortened and made thicker and that the positive lead 20 and the filter portion 21 are welded by resistance welding stably to provide good welding condition, achieves further reduction of the internal resistance of the battery, as well as improvement of the battery characteristics, such as high-rate charge-discharge characteristics.

In the manufacturing method described with reference to FIGS. 9A through 11B, an example was described in which the positive collector 11 is bonded to the end 3a of the positive electrode plate 3 and thereafter the positive lead 20 is bonded to the positive collector 11. This manufacturing method may be modified in such a manner that the positive collector 11 is bonded to the end 3a of the positive electrode plate 3 after the positive lead 20 is bonded to the positive collector 11. In this case, after the positive lead 20 shaped as shown in FIGS. 7A and 7B is bonded to the positive collector 11, the positive lead 20 is bent perpendicularly at a portion near the welded portions 28a and 28b in the connection base portion 20a to stand vertically, thereby moving the positive lead 20 upward so as not to disturb welding of the positive collector 11 as shown in FIGS. 12A and 12B. After welding of the positive collector 11 to the end 3a of the positive electrode plate 3 was completed, the positive lead 20 is bent to change its shape into the shape shown in FIG. 7B again. By employing the process mentioned above, welding of the positive collector 11 and the positive lead 20 is performed more easily.

Figure 13:
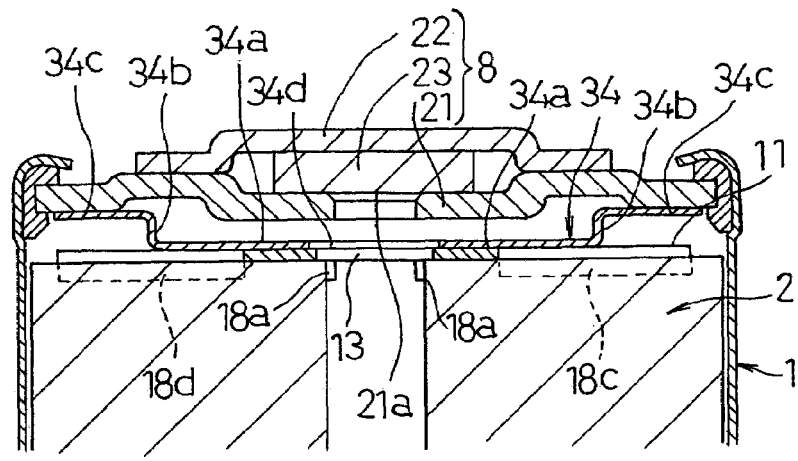
FIG. 13 is a vertical cross-sectional view of a sealing portion of a battery according to a fourth embodiment of the present invention.
Figure 14A:
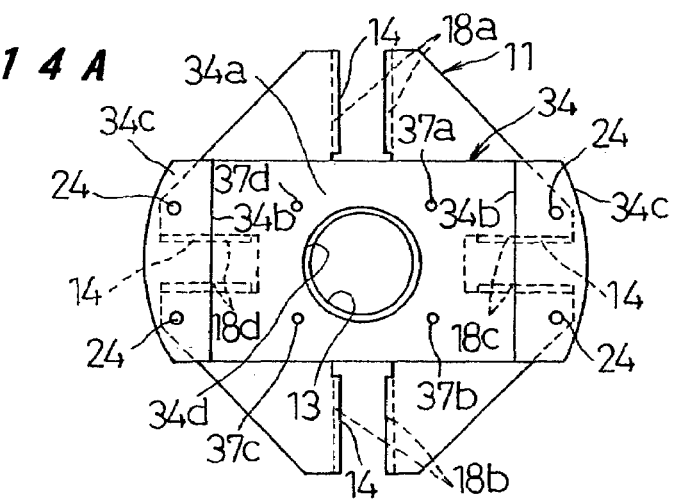
FIGS. 14A and 14B are a plan view and a cross-sectional view of the battery of the fourth embodiment, respectively, showing a relative arrangement of a positive collector and a positive lead.
Figure 14B:
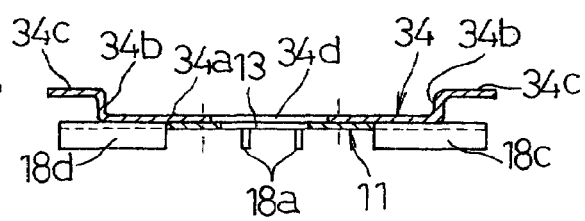

FIG. 13 is a vertical cross-sectional view of a sealing portion of a battery according to a fourth embodiment of the present invention, and FIGS. 14A and 14B are a plan view and a cross-sectional view, respectively, showing a relative arrangement of the positive collector 11 and a positive lead 34 in the battery of the fourth embodiment. In FIGS. 13, 14A and 14B, the components that are the same as or similar to those in FIGS. 6, 7A, and 7B are labeled with the same reference numerals, thereby omitting redundant description. The battery of the fourth embodiment is different from that of the third embodiment in that the positive lead 20 in the third embodiment that has a shape in which the connected portion 20c extends toward only one side of the positive collector 11 is replaced with the positive lead 34 having a different shape. The positive collector 11 is the same as that in the third embodiment. The positive lead 34 includes a connection base portion 34a having a circular gas escape hole 34d corresponding to the electrolyte-injection hole 13 of the positive collector 11, a pair of standing portions 34b respectively extending from both ends of the connection base portion 34a, and connected portions 34c extending from the corresponding standing portions 34b outward and parallel to the connection base portion 34a.

This battery provides the same advantageous effects as those mentioned in the third embodiment and further provides the following advantageous effects. In a case of the positive lead 20 of the battery of the third embodiment, the current paths between two welded portions 28a and 28b at which the positive collector 11 and the positive lead 20 are welded and three burring projections 18a, 18b, and 18c are short, whereas the current paths between the welded portions 28a and 28b and the other burring projection 18d are long. On the other hand, in the positive lead 34 of the battery of the present embodiment, four welded portions 37a through 37d are provided for four burring projections 18a through 18d, respectively, and the connected portions 34c having projections 24 are provided near two of the welded portions 37a through 37d. Thus, a current path between each of the four welded portions 37a through 37d and an associated one of the four projections 24 is made short, thus improving collecting efficiency and further reducing the internal resistance of the battery.

Figure 14C:
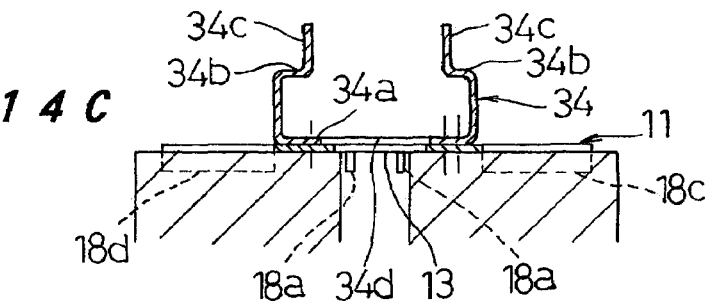
FIG. 14C is a cross-sectional view of that battery when a manufacturing process similar to the process shown in FIG. 7B is used.

The battery of the present embodiment may be manufactured by manufacturing processes similar to those shown in FIGS. 9A through 11B, with the same advantageous effects as those described in the third embodiment. However, the fabrication processes may be partially modified in such a manner that the positive lead 34 is bonded to the positive collector 11 and thereafter the positive collector 11 is bonded to the end 3a of the positive electrode plate 3. In this case, after the positive lead 34 is bonded to the positive collector 11 in a relative arrangement shown in FIGS. 14A and 14B, the positive lead 34 is bent perpendicularly at portions near the welded portions 37a through 37d arranged on both sides of the gas escape hole 34d in the connection base portion 34a so as to stand vertically, as shown in FIG. 14C. Thus, the portion other than the connection base portion 34a of the positive lead 34 is moved upward so as not to disturb welding of the positive collector 11 to the electrode plate group 2. After completion of the welding of the positive collector 11 to the end 3a of the positive electrode plate 3, the positive lead 34 is bent to change its shape into the shape shown in FIGS. 14A and 14B again. By employing these processes, the positive collector 11 and the positive lead 34 are welded more easily.

Figure 15A:
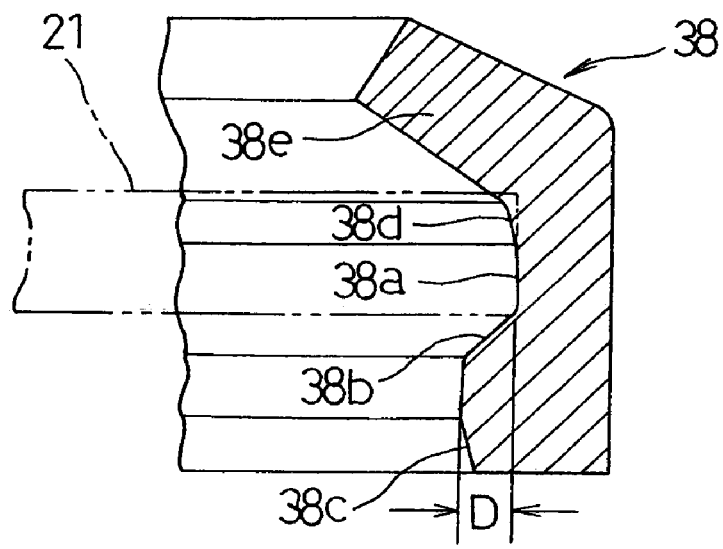
FIG. 15A is a partial cross-sectional view of another exemplary insulation gasket of the present invention.

FIG. 15A is a partial cross-sectional view of another exemplary insulation gasket 38 according to the present invention. This insulation gasket 38 is a short cylindrical molded part formed of nylon having the outer diameter substantially equal to the inner diameter of the enlarged portion 1a of the battery case 1. The insulation gasket 38 includes a holding inner wall face 38a having the inner diameter substantially equal to the outer diameter of the filter portion 21 of the sealing member 8; a supporting bottom portion 38b projecting inward from the lower end of the holding inner wall face 38a at an angle; a guide tapered side 38c broadening downward from a portion below the supporting bottom portion 38b; a latch projection 38d projecting inward from the upper end of the holding inner wall face 38a and having the inner diameter slightly smaller than the outer diameter of the filter portion 21; and a covering portion 38e extending inward from the latch projection 38d at an angle. The holding inner wall face 38a, the supporting bottom portion 38b, the guide tapered side 38c, the latch projection 38d, and the covering portion 38e are formed integrally. The projection length D of the supporting bottom portion 38b from the holding inner wall face 38a is set in a range from 0.2 mm to 0.4 mm.

In this insulation gasket 38, the projection length D of the supporting bottom portion 38b from the holding inner wall face 38a is set to fall within a range from 0.2 mm to 0.4 mm, as mentioned above. Thus, when being pressed against the peripheral edge portion of the filter portion 21 from above, the insulation gasket 38 is mounted to the peripheral edge portion of the filter portion 21 while interposing the peripheral edge portion from both sides in the vertical direction with an elastic force generated by such a deformation of the latch projection 38d and the supporting bottom portion 38b that they are enlarged, as shown with chain double-dashed line in FIG. 15A.

The covering portion 38e of the insulation gasket 38 is shaped to be inclined inward, i.e., toward a direction in which the covering portion 38e is to be deformed when the opening end of the battery case 1 is caulked inward. Thus, even if the length from the holding inner wall face 38a is set longer than that in the insulation gasket 27 shown in FIGS. 8A through 8D, for example, the caulking of the opening end of the battery case 1 is performed without any disturbance. For this reason, the length of the portion extending upward from the upper end of the holding inner wall face 38a, including the latch projection 38d and the covering portion 38e is set longer in this insulation gasket than that in insulation gaskets of existing batteries.

Figure 15B:
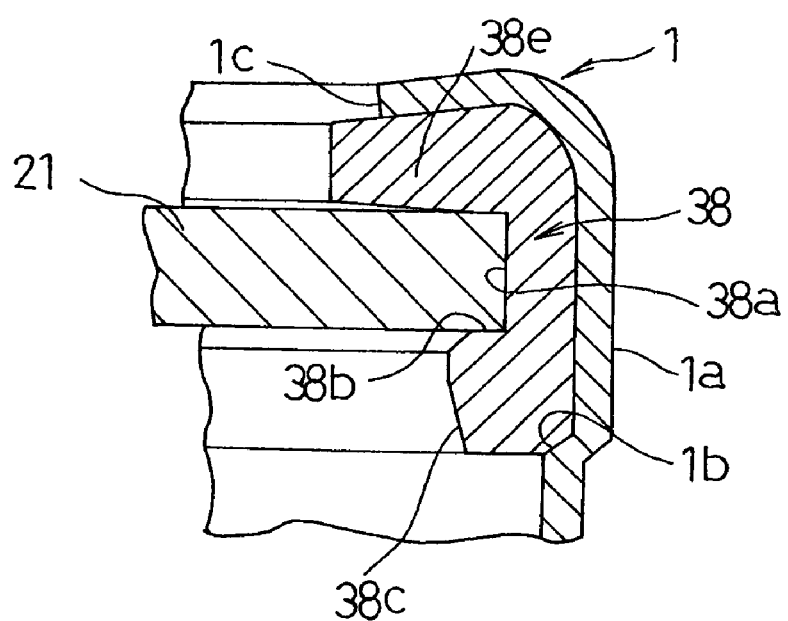
FIG. 15B is a cross-sectional view showing a state where a peripheral edge portion of a filter portion of a sealing member is held and secured by an opening end of a battery case that has been caulked toward the inside of the battery case, with the insulation gasket interposed therebetween.

Therefore, as shown in FIG. 15B, when the opening end of the battery case 1 is caulked inward, the covering portion 38e of the insulation gasket 38, that extends longer, projects more inward than the opening end face 1c of the battery case 1, so that the covering portion 38e prevents contact of the opening end of the battery case 1 with the upper surface of the filter portion 21 of the sealing member 8, as well as short-circuit between them. On the other hand, in a typical battery, as shown in FIG. 8D, for example, the opening end face 1c of the battery case 1 projects more inward than the insulation gasket 27. Therefore, electrically conductive foreign particles may enter a space between the opening end of the battery case 1 and the filter portion 21 or the opening end of the battery case 1 may be deformed because of fall of the battery or the like, resulting in short-circuit between the opening end of the battery case 1 and the filter portion 21.

Figure 16A:
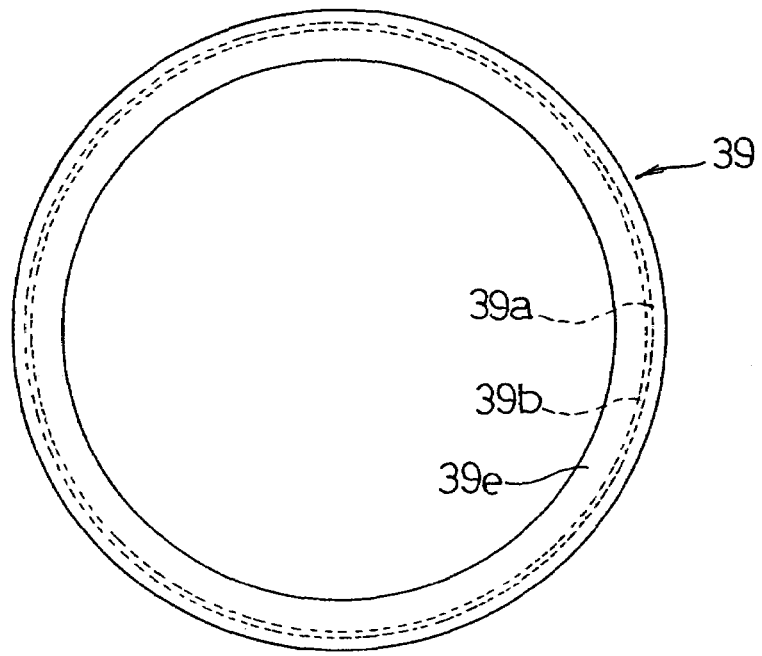
FIGS. 16A and 16B are a plan view and a cross-sectional view of still another exemplary insulation gasket of the present invention, respectively.
Figure 16B:
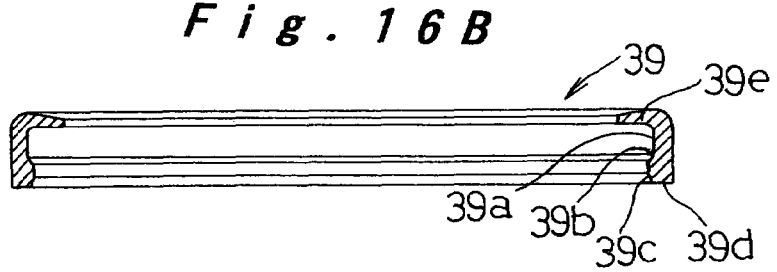
Figure 16C:
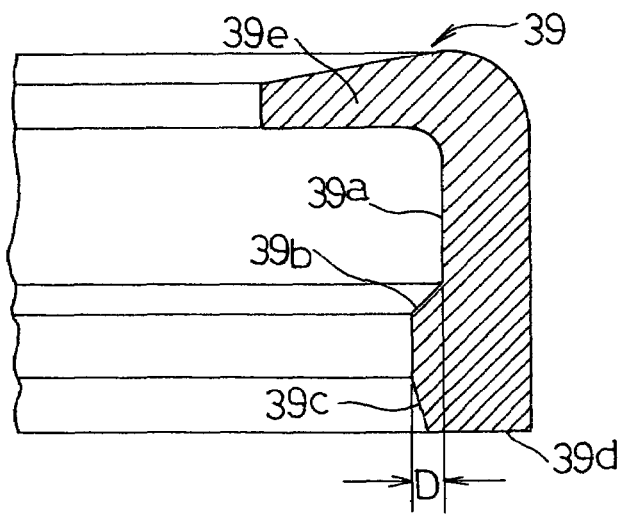
FIG. 16C is an enlarged view of a part of FIG. 16B.

FIGS. 16A through 16C illustrate still another exemplary insulation gasket 39 in the battery according to the present invention. FIG. 16A is a plan view, FIG. 16B is a cross-sectional view, and FIG. 16C is an enlarged view of a part of FIG. 16B. The insulation gasket 39 includes a holding inner wall face 39a having the inner diameter substantially equal to the outer diameter of the filter portion 21 of the sealing member 8, a supporting bottom portion 39b projecting inward from the lower end of the holding inner wall face 39a at an angle, a guide tapered side 39c shaped to broaden downward from a portion below the supporting bottom portion 39b, and a covering portion 39e projecting from the upper end of the holding inner wall face 39a parallel to a lower end face 39d. The holding inner wall face 39a, the supporting bottom portion 39b, the guide tapered side 39c, the lower end face 39d, and the covering portion 39e are formed integrally. The projection length D of the supporting bottom portion 39b from the holding inner wall face 39a is set to fall within a range from 0.2 mm to 0.4 mm.

The insulation gasket 39 provides the same advantageous effects as those of the insulation gasket 38 shown in FIGS. 15A and 15B, and further provides the following advantageous effects. In this insulation gasket 39, the covering portion 39e, that projects from the upper end of the holding inner face wall 39a parallel to the lower end face 39d, works to be latched by the upper end portion of the filter portion 21, like the latch projection 38d in the insulation gasket 38 shown in FIGS. 15A and 15B. Therefore, the latch projection 38d will be omitted in this insulation gasket 39, thus simplifying the shape of the insulation gasket 39. Moreover, this insulation gasket 39 has an advantage that it surely projects more inward than the opening end face 1c of the battery case 1 when caulking of the opening end of the battery case 1 is performed.

The insulation gasket 27 in the batteries of the third and fourth embodiments, the insulation gasket 38 shown in FIGS. 15A and 15B, and the insulation gasket 39 shown in FIGS. 16A and 16B have an advantage that any of them is mounted to the peripheral edge portion of the filter portion 21 of the sealing member 8 from the side opposite to the positive collector 11. In the mounting of the insulation gasket to the filter portion 21, one side of the insulation gasket is laid over and attached to the peripheral edge portion of the filter portion 21, and thereafter the other side is laid over and attached to the peripheral edge portion of the filter portion 21 while being enlarged. Therefore, it is difficult to automate the mounting process of the insulation gasket to the filter portion 21 in a case of using any of the aforementioned insulation gaskets 27, 38, and 39.

Figure 17A:
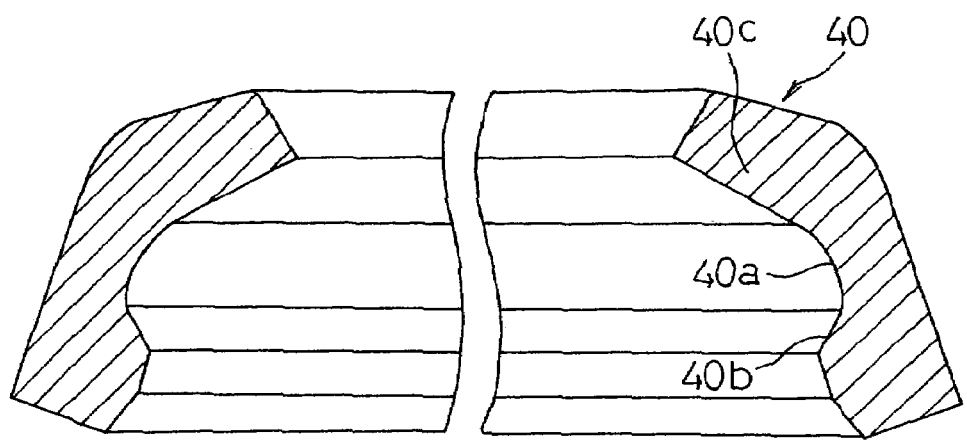
FIG. 17A is a partially broken cross-sectional view of still another exemplary insulation gasket of the present invention.
Figure 17B:
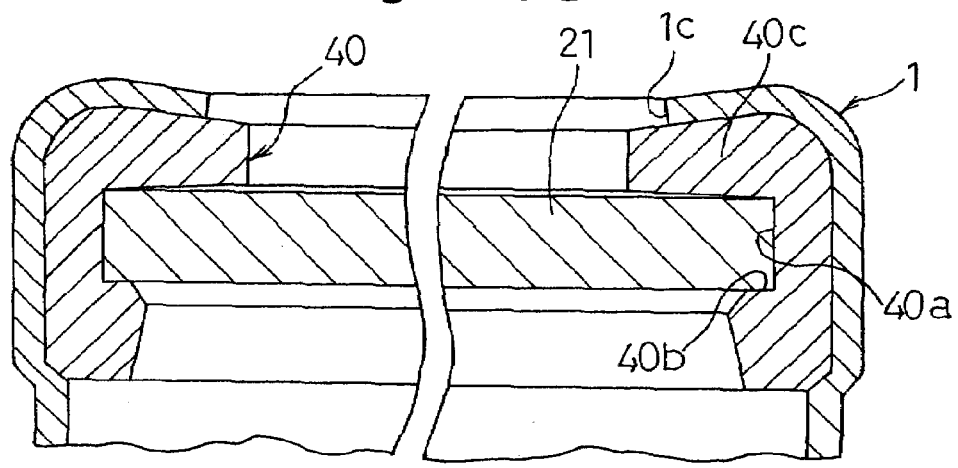
FIG. 17B is a partially broken cross-sectional view showing a state where the peripheral edge portion of the filter portion of the sealing member is held and secured by the opening end of the battery case that has been caulked toward the inside of the battery case, with that insulation gasket interposed therebetween.

Thus, by using an insulation gasket 40 shown in FIGS. 17A and 17B, the mounting of the insulation gasket 40 to the filter portion 21 will be automated. FIG. 17A is a partially broken cross-sectional view of the insulation gasket 40. FIG. 17B is a partially broken cross-sectional view showing a state where the peripheral edge portion of the filter portion 21 of the sealing member is securely held by the opening end of the battery case 1 that has been caulked inward with the insulation gasket 40 interposed between the filter portion 21 and the opening end of the battery case 1. Before mounting to the filter portion 21, the insulation gasket 40 has a cross-sectional shape that broadens downward, i.e., toward a position at which the positive collector 11 is to be arranged when the insulation gasket 40 is mounted to the filter portion 21, as shown in FIG. 17A. The insulation gasket 40 includes a holding inner wall face 40a that is to come into close contact with a peripheral end face of the filter portion 21 of the sealing member 8, a supporting bottom portion 40b for supporting the peripheral edge portion of the lower surface of the filter portion 21, and a covering portion 40c that is to be pressed against the peripheral edge portion of the upper surface of the filter portion 21. The holding inner wall portion 40a, the supporting bottom portion 40b, and the covering portion 40c are formed integrally.

FIGS. 18A through 18G are cross-sectional view sequentially showing manufacturing processes of the battery using the above insulation gasket 40. First, as shown in FIG. 18A, the insulation gasket 40 is supplied to a carrying-out station 41 formed by a pair of transfer rails and is then positioned at a predetermined take-out position. Thereafter, a transfer jig 42 goes down from above and a spindle 43 of the transfer jig 42 enters the inside of the insulation gasket 40 while deforming, i.e., slightly enlarging the insulation gasket 40. Thus, the insulation gasket 40 adheres to the outer circumferential surface of the spindle 43 by an elastic restoring force generated by the deformation. Then, when the transfer jig 42 moves upward and away from the carrying-out station 41, the insulation gasket 40 adhering to the spindle 43 is taken away from the carrying-out station 41.

Subsequently, as shown in FIG. 18B, the transfer jig 42 with the insulation gasket 40 moves to a position above the electrode plate group 2 to which the positive collector 11, the positive lead 20, and the filter portion 21 have been mounted in advance, and is then positioned and stopped at that position. Then, as shown in FIG. 18C, the transfer jig 42 goes down and a center pin 45, which is caused to project from the spindle 43 by a force applied by a compression spring 44 in the transfer jig 42, enters the inside of the electrolyte-injection hole 13 positioned at the center of the filter portion 21 while compressing the spring 44. Thus, the insulation gasket 40 attached to the spindle 43 is positioned at a predetermined relative position with respect to the filter portion 21 by fitting of the center pin 45 and the electrolyte-injection hole 13.

Then, as shown in FIG. 18D, a cylindrical holder 46, which fits around the spindle 43 of the transfer jig 42 so as to be freely slidable on the outer circumferential surface of the spindle 43, goes down and the lower end face of the holder 46 pushes the insulation gasket 40 down. Thus, the insulation gasket 40 is dismounted from the spindle 43, and thereafter is laid over the peripheral edge portion of the filter portion 21 as it is, because it has a cross-sectional shape that broadens downward. At this time, the spindle 43 is magnetized to absorb the electrode plate group 2.

The transfer jig 42 that has adhered to the electrode plate group 2 by the spindle 43 then moves to a position above the battery case 1 and is positioned and stopped at that position, as shown in FIG. 18E. Then, the transfer jig 42 goes down and inserts the electrode plate group 2 into the battery case 1. During this process, a guide cylinder 47 is arranged around the opening end of the battery case 1. This guide cylinder 47 has a shape in which the inner diameter is gradually reduced downward and the smallest inner diameter is set to be substantially equal to the inner diameter of the enlarged portion 1a of the battery case 1. Thus, as shown in FIG. 18F, when passing through the guide cylinder 47, the insulation gasket 40 having the cross-sectional shape that broadens downward is deformed to reduce the diameter of the lower part thereof while sliding on the inner circumferential surface of the guide cylinder 47, so that the insulation gasket 40 is pushed to the enlarged portion 1a until it reaches a predetermined position in the enlarged portion 1a. Then, the transfer jig 42 releases the magnetization of the spindle 43 and moves up. When the guide cylinder 47 also has moved up, a state shown in FIG. 18G is achieved. Then, when the cap-shaped positive terminal 22 is mounted to the filter portion 21 with the safety vent body 23 interposed therebetween, the assembly of the sealing member 8 is finished. Finally, the opening end of the battery case 1 is caulked inward and thereafter the enlarged portion 1*a* is subjected to a process for reducing its diameter. Thus, the battery is completed. According to this manufacturing method, most of the processes will be automated. Therefore, it is possible to mass-produce the battery with high productivity.

As is apparent from the above description, according to the battery of the present invention, a connection lead for electrically connecting the collector and the sealing member is largely shortened, and the collecting distance is also reduced by the length corresponding to reduction of the length of the connection lead. Moreover, internal resistance of the battery is greatly reduced, thereby increasing the battery output. Furthermore, the height of the electrode plate group is made higher by the height corresponding to a useless space provided by the inclusion of the annular supporting portion in the conventional battery. Thus, the volume of the electrode plate group, as well as the capacity of the battery, increases. Therefore, the battery of the present invention will be applicable to such as a power supply of a cordless power tool or an electric vehicle, that require large load characteristics. In addition, since the insulation gasket is mounted to the filter portion of the sealing member by being pressed against the filter portion from the side of the filter portion opposite to the collector, the insulation gasket is mounted to the connection lead that has been bonded to the collector in advance. Thus, the battery of the present invention is manufactured with high productivity.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery comprising:
   a cylindrical battery case having a bottom and an electrode plate group accommodated in the battery case, the electrode plate group has a strip-shaped positive electrode plate and a strip-shaped negative electrode plate spirally wound with a separator interposed therebetween, wherein
   an opening at an upper end of the battery case is sealed by a sealing member with an insulation gasket interposed therebetween,
   an annular supporting ledge protruding radially outward from an upper circumferential end of the battery case to form an enlarged portion having a diameter which is greater than a diameter of at least a portion of the battery case which accommodates the electrode plate group,
   the annular supporting ledge further does not include an annular groove formed radially inwardly of the battery case,
   a collector having one polarity is bonded to an end of the electrode plate having the one polarity that projects upward from the electrode plate group,
   to the collector of the one polarity, one end of a connection lead is bonded in an arrangement in which a notch formed at the one end of the connection lead is in agreement with a part of a hole edge of an electrolyte-injection hole at the center of the collector of the one polarity,
   the other end of the connection lead, which is a tip end of a folded portion extending from the one end, is bonded to a portion of the sealing member, the portion being displaced from a vent opening at the center of the sealing member toward the folded portion of the connection lead,
   a peripheral edge portion of the sealing member is supported by the supporting ledge with the insulation gasket interposed therebetween, and
   the peripheral edge portion of the sealing member is fastened in a horizontal direction with the insulation gasket interposed therebetween.

2. The battery according to claim 1, wherein
   the insulation gasket comprises a supporting bottom portion for supporting the peripheral edge portion of the sealing member and a pressing piece that extends downward from the supporting bottom portion at an angle, the supporting bottom portion and the pressing piece being formed integrally, and
   a lower end of the pressing piece comes into elastic contact with an upper peripheral end portion of the collector of the one polarity.

3. The battery according to claim 1, wherein the battery case comprises metal.

4. The battery according to claim 1, wherein the peripheral edge of the sealing member is fastened to the battery case by forming the opening end of the battery case inwardly of the enlarged portion, and caulking the opening end of the battery case.

5. The battery according to claim 1, wherein the annular supporting ledge is positioned radially outward of the electrode plate group.

* * * * *